United States Patent
Kosaka et al.

(10) Patent No.: US 6,233,091 B1
(45) Date of Patent: May 15, 2001

(54) OPTICAL AMPLIFIER UNIT CONTROL METHODS, OPTICAL AMPLIFIER SYSTEMS AND SYSTEMS WHICH USE THE METHODS AND AMPLIFIER SYSTEMS

(75) Inventors: Junya Kosaka, Fujisawa; Shinji Sakano, Yokohama, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/542,702

(22) Filed: Apr. 3, 2000

Related U.S. Application Data

(63) Continuation of application No. 08/978,044, filed on Nov. 25, 1997, now Pat. No. 6,078,422.

(30) Foreign Application Priority Data

Nov. 25, 1996 (JP) .................................................. 8-313759

(51) Int. Cl.[7] .................................................. H01S 3/00
(52) U.S. Cl. .................................................. 359/341; 359/124
(58) Field of Search .................................................. 359/341, 124, 359/161

(56) References Cited

U.S. PATENT DOCUMENTS

| | | | |
|---|---|---|---|
| 5,506,724 | * | 4/1996 | Shimizu et al. ........... 359/341 |
| 5,570,227 | | 10/1996 | Nabeyama et al. . |
| 5,633,749 | | 5/1997 | Shibuya . |
| 5,633,750 | * | 5/1997 | Nogiwa et al. ........... 359/341 |
| 5,864,422 | * | 1/1999 | Miyazaki et al. ........... 359/341 |
| 6,078,422 | * | 6/2000 | Kosaka et al. ........... 359/341 |

FOREIGN PATENT DOCUMENTS

| | | |
|---|---|---|
| 6-45682 | 2/1994 | (JP) . |
| 8-18138 | 1/1996 | (JP) . |

OTHER PUBLICATIONS

"A Consideration of Optical Surge in Optical Amplifier Systems", Discussion of Light Surge in Multi-stageous Connection of Optical Amplifiers, Spring Meeting B941, Institute of Electronics, Information and Communication Engineers of Japan, 1993.

* cited by examiner

*Primary Examiner*—Mark Hellner
(74) *Attorney, Agent, or Firm*—Antonelli, Terry, Stout & Kraus, LLP

(57) ABSTRACT

An optical amplifier controlling method and optical amplifier system which are simple in composition, maintain the S/N ratio of an optical signal output, have high control responsiveness, suppress the generation of a light surge, and amplify the optical signal, and a system using the method and amplifier system. The optical amplifier system includes an optical amplifier unit which is supplied with energy by pumping light and amplifies with the supplied energy an optical signal inputted to the amplifier unit. The optical amplifier system includes a gain control unit for controlling the gain of the amplifier system depending on the strength of the optical signal inputted to the amplifier system such that the amplifier has a maximum gain at a predetermined value of the strength of the optical signal inputted in the optical amplifier system and an area of a positive gain of not more than the maximum gain for a strength of the optical signal of not more than the predetermined value.

13 Claims, 26 Drawing Sheets

-10.0000 ns　　　0.00000 s　　　10.0000 ns
2.00 ns/div

-10.0000 ns　　　0.00000 s　　　10.0000 ns
2.00 ns/div

-5.00000 us     5.00000 us     15.0000 us
2.00 us/div

-10.0000 us     15.0000 us     40.0000 us
5.00 us/div

-10.0000 us    15 0000 us    40.0000 us 5.00 us/div

-10.0000 us    15.0000 us    40.0000 us 5.00 us/div

OPTICAL AMPLIFIER UNIT CONTROL METHODS, OPTICAL AMPLIFIER SYSTEMS AND SYSTEMS WHICH USE THE METHODS AND AMPLIFIER SYSTEMS

CROSS-REFERENCE TO RELATED APPLICATION

This is a continuation of U.S. application Ser. No. 08/978,044, filed Nov. 25, 1997, now U.S. Pat. No. 6,078,422, the subject matter of which is incorporated by reference herein.

The application relates to U.S. Pat. Ser. No. 08/793151, filed Jul. 4, 1996 entitled "LIGHT AMPLIFICATION MEDIUM CONTROL METHOD, LIGHT AMPLIFICATION APPARATUS AND SYSTEM USING THE SAME", to Junya Kosaka, et al. and assigned to HITACHI, LTD. and NIPPON TELEGRAPH AND TELEPHONE CORPORATION.

BACKGROUND OF THE INVENTION

The present invention relates to optical transmission networks, optical communication systems or optical transmission systems, various optical transmission devices which include the optical amplifier systems used in those systems, and methods of controlling the systems and devices. More particularly, the present invention relates to an optical amplifier unit controlling method, an optical amplifier system, and a system which uses the method and system.

It is necessary to suppress light surges to the utmost in general optical amplifier systems. The "light surge" referred to herein points out an optical signal with an extremely high gain which is outputted from an optical amplifier system when the optical signal input to the optical amplifier system increases momentarily. The light surge is generated on the following reasons. It is necessary to expand the power of pumping light and to increase the amplification degree of an optical amplifier unit to obtain a desired optical signal output when the inputted optical signal decreases. Thus, in that case, large amplified optical signal energy is accumulated potentially in the optical amplifier unit. In such a state, if the optical signal input increases, the optical signal receives the energy accumulated so far and is outputted with a very high gain from the amplifier. If a light surge is generated, destruction of a photodetector in the optical communication end and melting of an end face of an connector concerned would be invited but also human (sight) injury would be caused. Therefore, it is necessary to suppress the generation of the light surge to the utmost. Especially, when optical amplifier systems are arranged in a multi-stage connection, the situation would be further serious. The reason for this is as follows: a light surge generated once is amplified one after another in the respective subsequent optical amplifier systems. As a result, the optical parts which compose each of those optical amplifier systems might be fatally destroyed with the respective increasing surges.

Current examples of measures against optical surges are described in the paper "Discussion of Light Surge in Multistageous Connection of Optical Amplifiers" (Spring Meeting B-941, Institute of Electronics, Information and Communication Engineers of Japan, 1993). The composition of an experimental system in the example of the measures is shown in FIG. 41A. The optical output level of each of the multistage-connected optical amplifiers is shown is FIG. 41B. As shown in FIG. 41A, an optical signal with available risetime can be generated from an laser diode (LD) (an LD module of the DFB (Distribution Feed Back) type having a center wavelength of 1.55 $\mu$m) as the optical signal source by driving the LD with a current. Optical signals from that LD are passed sequentially via the amplifiers AMP1–AMP5, which are erbium doped optical fiber amplifiers which are pumped by a 1.48 $\mu$m wavelength pump laser) with optical attenuators (ATTs) arranged before the corresponding amplifiers, and provided as an optical signal output. The waveforms of the respective optical signals outputted from those optical amplifiers are observed by corresponding photodiodes (PDs) via ATTs. As will be seen from FIG. 41B, the surge is suppressed in proportion to an increase in the risetime of the optical signal from the LD. Especially, when the risetime is set at the order of several milliseconds, light surges are hardly generated.

The amplifier composition of JP-A-6-45682 is shown in FIG. 42. As shown in FIG. 42, the optical signal multiplexed by an optical multiplexer 52 and pumping light from a laser diode 53 pass forwardly through the optical isolator 54 and enter a doped fiber 55. Then, the pumping light and the rare earth elements doped in the waveguide area causes induced emissions, and the optical signal is amplified. The amplified optical signal and the pumping light which remains unconsumed enter an optical bandpass filter 56. In the bandpass filter 56, the pumping light and spontaneous emission light which will be elements of noise are removed. The amplified optical signal alone passes an optical bandpass filter 56. Thereafter, a part of the optical signal is separated by an optical splitter 57, and the separated signal part is received by a photodetector 58. A bias control circuit 59 compares a direct current voltage from the photodetector 58 with a reference voltage Vref1 and controls a bias current flowing in the laser diode 53 so that an error between the direct current voltage and the reference voltage may become zero. Reference numeral 60 denotes a 4-port optical circulator having ports 60A, 60B, 60C and 60D. The light supplied to the port 60A is outputted only from the port 60B, the light supplied to the port 60B is outputted only from the port 60C, the light supplied to the port 60C is outputted only from port 60D, and the light supplied to the port 60D is outputted only from the port 60A. The control light from the laser diode 61 is supplied to the port 60A. The port 60B is connected with a port 57B of the optical splitter 57, the port 60C is connected with an output optical transmission path (not shown), and the port 60D is made a dead end. The control light from the laser diode 61 is introduced into the doped fiber 55 by passing the optical circulator 60, optical splitter 57, and optical band pass filter 56 in this order. Simultaneously, a bias control circuit 62 controls a bias current flowing through the laser diode 61 to thereby control the power of the control light from the laser diode 61 so that the error between a direct current voltage from the photodetector 58 and a reference voltage Vref4 may be zero.

According to the prior art JP-A-45682, the wavelength of the control light is set in a wavelength band where induced emission occurs in the doped fiber 55, for example at substantially the wavelength of the optical signal. When the power of the input signal changes comparatively slowly, the photodetector 58 receives a part of the optical signal which has passed through the optical bandpass filter 56. A bias control circuit 59 controls the power of the pumping light from the laser diode 54. When the power of the input optical signal changes rapidly, a bias control circuit 62 controls the power of the control light supplied by the laser diode 61. As a result, even if the input signal changes rapidly, the power of the output signal is kept constant.

In addition, the composition of the prior art JP-A-8-18138 is shown in FIG. 43. As shown in FIG. 43, in this composition, Two optical amplifiers AMP1 and AMP2 are connected in cascade. The first optical amplifier AMP1 is provided with a first pump source 102 composed of a first EDF, an LD, etc., a first multiplexer 104, and a first isolator 106. An optical signal input is applied to the first optical amplifier AMP1 via an optical isolator ISO connected with one end of the input side optical fiber. The first EDF 100 is pumped by the first pump source 102 via the first multiplexer 104. The optical signal which has passed the first EDF 100 is inputted to the second optical amplifier AMP2 through the first optical isolator 106.

The second optical amplifier has a second EDF 108, delay fiber 110, second pumping source 112, second multiplexer 114, second optical isolator 116, third EDF 118, attenuator 120, third optical isolator 122, first splitting coupler 124, second splitting coupler 126 and photodetector 128. The first splitting coupler 124 splits the light from the first isolator 106 into two light portions at a predetermined ratio. The first split light portion enters the second EDF 108 through the delay fiber 110. The second split light portion enters the third EDF 118 through the attenuator 120. The second EDF 108 is connected with the splitting coupler 126. The third EDF 118 is connected with the second splitting coupler 126 through the third optical isolator 122. The second EDF 108 is excited by the second pump source 112 through the second multiplexer 114. The output light of the second multiplexer 114 is outputted to the output optical fiber through the second optical isolator 116.

The third EDF 118, attenuator 120, and the third isolator 122 compose an optical path which, when light of more than a predetermined optical strength, for instance, a light surge pulse, inputs to the first splitting coupler 124, functions to give to the second EDF 108 light which passes in a direction opposite to that in which the optical signal which passes the second EDF 108 via the splitting coupler 126 to thereby decrease the gain of the second EDF 108. Specifically, the second EDF 108 is caused to perform induced emission in a direction opposite to that in which the optical signal passes. In this case, the delay fiber 110 delays light from the first splitting coupler 124 so that the induced emission may occur before the light surge pulse enters the second EDF 108 through delay fiber 110.

In summary, generation of the light surge in the second optical amplifier AMP 2 is prevented by the light surge pulse generated in the first optical amplifier AMP1.

However, the above-mentioned document "Discussion of an Optical Surgre in the Optical Amplifier Multi-Stage Connection" only a little describes a method of suppressing a light surge by controlling a risetime of the optical signal input. Even by application of the method of suppressing a light surge to an actual optical communication system, a light surge due to a cause other than the rise in the optical signal input cannot be suppressed. That is, the application of such suppression is considerably limited. When physical vibrations and impact are applied to an optical fiber which is in the state of optical signal transmission even if the risetime of the optical signal input is controlled, a light surge might be easily invited due to a momentary change in the optical signal power which is due to the physical vibrations and impact.

In addition to the above-mentioned defects, the power of the pumping light from the pump source is required to be decreased or the pumping light is required to be stopped temporarily in the conventional optical amplifier in order to suppress a light surge. In that case, the light surge is not suppressed at a decreasing speed of the pumping light power to be suppressed. Improvement of the control responsiveness cannot be expected. The reason for this is that the degree of suppression of the light surge is dependent on the energy accumulated before the optical signal which is inputted to the optical amplifier unit rises, the rising speed of the optical signal and its optical power, the suppressing speed of the light surge is lower than the decreasing speed of the pumping power. Thus, the pumping light output from the pump source is put in the state of a temporary stop until the light surge is suppressed to a preset value. This implies that there is actually a blank time in which the surge cannot be effectively suppressed only with the pump source. It also implies that the light surge continues to be generated during the blank time.

In addition, in the conventional optical amplider, it is necessary to greatly change the driving current to the pumping source to stabilize the optical signal output from the optical amplifier against a momentary change in the optical signal input to the optical amplifier. When the driving current changes greatly, the light surge would be a factor to lack the stability of the optical signal output and to deteriorate the S/N ratio of the entire optical amplifier, as a result of the oscillation wavelength in the pump source changing.

The prior art JP-A-6-45682 refers to the optical output control speed by the control light, but not to its power. Actually, consumption control of the energy accumulated excessively in the doped fiber rather than the control speed and the specified measures for the consumption control of the energy are required to suppress the light surge surely, but this prior art does not refer to that point.

Moreover, it is difficult to carry out the consumption control of the energy accumulated excessively in the doped fiber in the control light of this prior art. The reason for this is that the wavelength region of the LD of substantially the same wavelength as the optical signal used as the control light is approximately 0.1 nm or less in the optical fiber transmission, the control light is caused to pass a bandpass filter which filters out wavelength components other than the wavelength of the LD to enter the doped fiber, and independent pumping light is required to be prepared. Any of them cannot supply energy enough for suppression of the light surge.

It is natural to decrease the loss of the optical signal so as not to impair the original function of the optical amplifier. In this prior art, the loss of the power of the control light is further required to be decreased. Therefore, it is necessary to provide expensive optical parts such as optical circulators which multiplex and split both the output optical signal and the control light at a low loss, as shown by the prior art.

In addition, it is necessary to have a separate laser diode used for the control light and a super-high output LD, which would cause a new problem of development.

Moreover, since the noise figure and amplification gain which are the characteristic elements of the optical amplifier are greatly deteriorated by introduction of the control light, the introduction of the control light adversely affects the inherent characteristics of the optical amplifier. The prior art never refers to a method of avoiding this problem.

In addition, the prior art has a composition in which the photodetector 58 feeds back the monitor output to control the pumping light and the control light and detects the optical outputs from the doped fiber 55 and the bandpass filter 56 to suppress the light surge. Therefore, when the input signal power, for example, decreases, excessive energy has already been accumulated in doped fiber 55. Therefore, this would be a factor of a light surge, this phenominum cannot be detected by the photodetector 58 alone. Moreover, with the detection of the photodetector 58, the light surge which has already been generated cannot be suppressed. It is difficult for the entire optical amplifier to suppress a light surge securely at high speeds only by monitoring the output of the amplifier.

Moreover, although a change in the optical output is referred to, a method of coping with a changing light input itself which is a fundamental cause of the light surge is not found regrettably.

In addition, though a method of controlling the optical output of the optical amplifier is mentioned, control over the gain of the optical signal is not described.

Moreover, in the prior art JP-A-8-18138, if the light surge generated by the first optical amplifier does not exceeded a fixed level, the advantageous effect of the invention is not produced. That is, the first optical amplifier necessarily generates a light surge functionally. Therefore, the light surge generated by the first optical amplifier is input directly to the optical multiplexer and optical isolator provided after the first EDF. Therefore, there is a danger that the generated light surge may adversely affect, for example, impair these devices. As described also in the prior art, a method of controlling the first pump source such that in the actual system the optical output of the first optical amplifier AMP1 is split and the split output portion is monitored and maintained at a constant value is generally used. At this time, it can be easily imagined that there is a danger that the photodetector for monitoring purposes, etc., may be destroyed by the light surge generated by the first optical amplifier.

The use of a splitting coupler having a high splitting ratio to minimize the optical loss of the main optical signal cannot be avoided (In the prior art, two 1:10 optical couplers are used). As a result, not only the light surge which reaches the third EDF but also light introduced into the second EDF becomes slight. In addition, because the optical power is greatly attenuated by the third EDF and optical attenuator in the prior art, the optical power which can be actually introduced into the second EDF becomes slight. The prior art describes that the split light surge is rendered to have about −10 to −20 dBm. It is necessary to supply optical power of −10 dBm or more to suppress the light surge at a very safe level, as will be explained in detail as follows. An enough light surge suppression effect is not achieved by the prior art method.

On the other hand, if the amount of attenuation is decreased to improve the light surge suppression effect in the prior art, there is a possibility that a ring oscillation will normally occur through a loop including the first EDF, third EDF and the delay fiber. This is undesirable to ensure the reliability of the real system. After all, the effect of the optical purge suppression in this prior art is considerably limited.

In addition, we verified and confirmed that light having wavelengths (spontaneous emission components) other than the wavelength of an optical signal which is a main component of the light surge fills a large role of increasing the surge suppression effect. However, in the prior art, the light components other than the optical signal wavelength have low power, and hence they are absorbed and their advantageous effects cannot be obtained.

In the embodiment, the composition of a ring laser is shown. It is known well in this composition that the maximum gain of the EDF certainly becomes constant because the oscillation threshold is determined. However, no measures are mentioned which prevent a possible light surge from occurring by referring to the difference in level between the input optical signals (for instance, the difference between minus infinity and −20 dB from which the input optical signals rise respectively) at a gain below the maximum gain.

SUMMARY OF THE INVENTION

A first object of the present invention is to provide an optical amplifier controlling method and optical amplifier system which is simple in construction, maintains the S/N ratio of an optical signal output, and has high control response, suppresses generation of a light surge while amplifying the input optical signal, and a system which uses the method and amplifier system.

A second object of the present invention is to provide an optical amplifier controlling method and optical amplifier system which suppresses accumulated energy which would cause a light surge while amplifying the optical signal input without any devices, for example, for control light used for suppression of the light surge, and a system which uses the method and amplifier system.

A third object of the present invention is to provide an optical amplifier unit controlling method and optical amplifier system which suppresses the generation of a light surge while amplifying an optical signal input without providing a separate device for the control light and a system which uses the method and amplifier system.

A fourth object of the present invention is to provide an optical amplifier unit controlling method and an optical amplifier system which supplies high energy only for efficient suppression of a light surge while amplifying the optical signal input, and a system which uses the method and the amplifier system.

A fifth object of the present invention is to provide an optical amplifier unit controlling method and optical amplifier system which is easily composable without using any expensive optical parts, and a system which uses such method and amplifier system.

A sixth object of the present invention is to provide an optical amplifier unit controlling method and optical amplifier which suppresses a light surge efficiently while amplifying the optical signal input without adversely affecting the characteristic elements of the amplifier unit other than its elements which suppress the light surge in the optical amplifier, and a system which uses such method and amplifier system.

A seventh object of the present invention is to provide an optical amplifier unit controlling method and optical amplifier system which suppresses a light surge surely at high speeds, and a system which use the method and the amplifier system, when the optical amplifier unit controlling method, optical amplifier system and the system which use the method and amplifier system are viewed as a whole.

An eighth object of the present invention is to provide an optical amplifier unit controlling method and optical amplifier which copes with a changing light input as a basic cause which generates a light surge, consumes energy accumulated excessively in a doped fiber while amplifying the optical signal input, and a system which uses the method and amplifier system.

The above objects are basically achieved by at least an optical amplifier unit and a pump source for pumping the amplifier, as main components; and a first splitter for separating a part of an optical signal output from the optical amplifier unit, a return unit for returning the separated part of the optical signal via the first splitter to the optical amplifier, a second splitter for separating a part of the returned optical signal part, an optical detecting unit for detecting the separated optical signal part from the second splitter, and a control unit for controlling at least one of the pump source and the return unit on the basis of detected light power from the optical detecting unit, as further components. Alternatively, the above objects may be achieved by at least an optical amplifier unit and a pump source for pumping the amplifier as main components; and a first splitter for separating a part of an optical signal output from the optical amplifier unit, a return unit for returning the separated part of the optical signal via the first splitter to the optical amplifier, a second splitter for separating a part of the returned optical signal part, a first optical detecting unit for detecting the separated optical signal part from the second splitter, a third optical splitter for separating a part of return light returned to and amplified by the optical amplifier unit, a second detecting unit for detecting the separated optical signal part from the third splitter, and a control unit for controlling at least one of the pump source and the return unit on the basis of detected light power from the first and second optical detecting unit, as further components.

The above objects are also achieved by gain control means for controlling the gain of the amplifier system depending on the strength of an optical signal inputted to the amplifier system such that the amplifier unit has a maximum gain at a predetermined value of the strength of an optical signal inputted to the optical amplifier system and an area of a positive gain of not more than the maximum gain for a strength of the optical signal of not more than a predetermined value.

The above objects are also achieved by detecting means for detecting the strength of light inputted to the optical amplifier system; control means for receiving a detection signal representing the strength of the inputted light and for recognizing that the strength of the inputted light is not more than the predetermined value; control light introducing means for receiving a control signal from the control means and for introducing into the optical amplifier unit surge control light which controls a light surge occurring in the optical amplifier unit, whereby a noise figure of the optical amplifier system is suppressed at a value not more than 10 dB.

The above objects are also achieved by detecting means for detecting the strength of light inputted to the optical amplifier system; control means for receiving from the detecting means a detection signal representing the strength of the inputted light and for recognizing that the strength of the inputted light is not more than the predetermined value for at least 10 $\mu$s; control light introducing means for receiving a control signal from the control means and for introducing into the optical amplifier unit surge control light which controls a light surge occurring in the optical amplifier unit.

The above objects are also achieved by optical controller means for introducing into the optical amplifier unit control light having a wavelength of approximately at least 2.7 $\mu$m.

The above objects are also achieved by optical controller means for introducing control light having a strength of not less than 80 $\mu$W into the optical amplifier unit.

The above objects are also achieved by an optical receiver system having an amplifying function and including an optical amplifier unit for amplifying an optical signal and receiving means for receiving an amplified optical signal from the amplifier unit, the amplifier having surge controlling means for controlling a light surge occurring therein.

The above objects are also achieved by gain control means for controlling the gain of the amplifier system depending on the strength of an optical signal inputted to the amplifier system such that the strength of an optical signal outputted from the amplifier system is forcibly reduced during a period of time from the time when the strength of the inputted optical signal indicated a value of not more than a predetermined value for not less than a predetermined time to the time when the strength of the inputted optical signal indicates a value of not less than the predetermined value.

The above objects are also achieved by an optical transmission system comprising: a transmitter system for transmitting an optical signal; an optical amplifier system for receiving the optical signal from the optical transmitter system and for amplifying and outputting the optical signal; and a receiver for receiving the outputted signal from the amplifier system; the amplifier system comprising an optical amplifier unit for receiving the optical signal from the transmitter system, a pump source for pumping the amplifier unit, and an optical controller for introducing control light having a wavelength of proximately at least 2.7 $\mu$m into the optical amplifier unit.

The above objects are also achieved by an optical transmission system comprising: an optical transmitter system for transmitting an optical signal; an optical amplifier system having a maximum gain of at least 28 dB for receiving the optical signal from the optical transmitter system and for amplifying and outputting the optical signal; and a receiver for receiving the outputted signal from the amplifier system; the amplifier system comprising an optical amplifier unit for receiving the optical signal from the transmitter system, a pump source for pumping the amplifier unit, and an optical controller for introducing control light having a strength of at least 80 $\mu$W into the optical amplifier unit.

The above objects are also achieved by an optical transmission system comprising: a transmitter system for transmitting an optical signal; an optical amplifier system for receiving the optical signal from the transmitter system and for amplifying and outputting the optical signal, the amplifier system being provided directly after the transmitter system and comprising a surge control unit for controlling a light surge which may occur in the optical amplifier system; a transmission fiber for transmitting the optical signal amplified by the optical amplifier system; and a receiver for receiving the optical signal transmitted by the transmission fiber.

The above objects are also achieved by an optical transmission system comprising: an optical switch having a single input and a plurality of outputs; an optical amplifier system for receiving an optical signal from at least one of the plurality of outputs of the optical switch and for amplifying and outputting the optical signal, the amplifier system being provided directly after the optical switch and comprising a surge control unit for controlling a light surge; a transmission fiber for transmitting the optical signal amplified by the optical amplifier system; and a receiver for receiving the outputted signal from the transmission fiber.

The above objects are also achieved by an optical transmission system comprising: an optical switch having a plurality of inputs and a single output; an optical amplifier system for receiving an optical signal from the optical switch and for amplifying and outputting the optical signal, the amplifier system being provided directly after the optical switch and comprising a surge control unit for controlling a light surge; a transmission fiber for transmitting the optical signal amplified by the optical amplifier system; and a receiver for receiving the outputted signal from the transmission fiber.

The above objects are also achieved by an optical transmission system comprising: a transmitter system for transmitting an optical signal; an optical amplifier system for receiving the optical signal from the transmitter system and for amplifying and outputting the optical signal, the amplifier system being provided directly before the optical receiver and comprising a surge control unit for controlling a light surge which may occur in the optical amplifier system; a transmission fiber for transmitting the optical signal amplified by the optical amplifier system; and a receiver for receiving the outputted signal from the transmission fiber.

The above objects are also achieved by an optical transmission system comprising: a transmitter system for transmitting an optical signal having a multiplexed wavelength; an optical amplifier system for receiving the optical signal from the transmitter system and for amplifying and outputting the optical signal, the amplifier system comprising an optical amplifier unit supplied with energy by pumping light for amplifying the optical signal having a multiplexed wavelength and a surge control unit for controlling a surge which may occur in the receiver; and a receiver for receiving the amplified optical signal from the amplifier system.

The above objects are also achieved by an optical transmission system comprising: a transmitter system for transmitting an optical signal; an optical amplifier system for receiving the optical signal from the transmitter system and for amplifying and outputting the optical signal, the amplifier system comprising an optical amplifier unit supplied with energy by pumping light for amplifying the optical signal with the pumping light and a gain control unit for controlling a gain depending on the strength of the optical signal inputted to the optical amplifier system; and a receiver for receiving the amplified signal from the amplifier system.

The above objects are also achieved by an optical transmission system comprising: a transmitter system for transmitting an optical signal; and a receiver system having an amplifying function for receiving the optical signal from the transmitter system, the optical receiver system comprising an optical amplifier for amplifying and outputting the optical signal from the transmitter system and a receiver for receiving the amplified optical signal from the optical amplifier, the optical amplifier comprising a surge control unit for controlling a light surge which may occur in the optical amplifier.

The above objects are also achieved by an optical transmission system for performing long distance signal transmission, comprising: a transmitter system for transmitting an optical multiplexed signal; an optical amplifier system disposed directly after the optical transmitter for receiving the multiplexed signal from the transmitter system, and for amplifying and outputting the multiplexed signal, the amplifier system comprising an optical amplifier unit supplied with energy by pumping light for amplifying the optical signal and a gain control unit for controlling a gain of the optical amplifier system depending on the strength of the optical signal inputted to the optical amplifier system, the gain control unit having a maximum gain at a predetermined value of the strength of the input optical signal and having an area of a positive gain lower than the maximum gain for the strength of the input optical signal lower than the predetermined value; and a receiver (8) for receiving the optical signal from the optical amplifier system.

The above objects are also achieved by an optical transmission system which performs long distance signal transmission, comprising: an optical transmitter for transmitting a multiplexed optical signal; a plurality of cascaded optical amplifier systems for receiving the multiplexed optical from the optical transmitter signal and for amplifying and outputting the multiplexed optical signal, one of the plurality of optical amplifier systems being disposed directly after the optical transmitter, the one optical amplifier system comprising an amplifier supplied with energy by pumping light for amplifying the multiplexed optical signal and a gain control unit for controlling a gain of the one optical amplifier depending on the strength of the optical signal inputted to the one optical amplifier system, the gain control unit controlling the one optical amplifier system so as to have a maximum gain at a predetermined value of the strength of the inputted optical signal and an area of a positive gain below the maximum gain; and an optical receiver for receiving the amplified optical signal from the amplifier system.

The above objects are also achieved by an optical transmission system which performs long distance signal transmission, comprising: a transmitter system for transmitting a multiplexed optical signal; a plurality of cascaded optical amplifier systems for receiving the multiplexed optical from the optical transmitter system and for amplifying and outputting the multiplexed optical signal, a first one of the plurality of optical amplifier systems disposed directly after the transmitter system comprising a surge control unit for controlling a light surge which may occur therein so that the strength of the optical signal inputted to the first optical amplifier system is not more than 16 dBm; and a receiver for receiving the amplified multiplexed optical signal output from a last one of the plurality of cascaded optical amplifiers.

The above objects are also achieved by an optical transmission system which performs long distance signal transmission, comprising: an optical switch having a single input and a plurality of outputs; a plurality of cascaded optical amplifier systems for receiving an optical from at least one of the plurality of outputs of the switch and for amplifying and outputting the optical signal, one of the plurality of optical amplifier systems being disposed directly after the optical switch, the one optical amplifier system comprising a surge control unit for controlling a light surge occurring therein so that the strength of the optical signal inputted to the one optical amplifier system is not more than 16 dBm; and a receiver for receiving the optical signal output from a last one of the plurality of cascaded optical amplifiers.

The above objects are also achieved by an optical transmission system which performs long distance signal transmission, comprising: an optical switch having a plurality of inputs and a single output; a plurality of cascaded optical amplifier systems for receiving an optical signal from the switch and for amplifying and outputting the optical signal, a first one of the plurality of optical amplifier systems disposed directly after the optical switch comprising a surge control unit for controlling a light surge which may occur therein so that the strength of the optical signal inputted to the first optical amplifier system is not more than 16 dBm; and a receiver for receiving the optical signal output from a last one of the plurality of cascaded optical amplifiers.

The above objects are also achieved by an optical transmission system which performs long distance signal transmission, comprising: a transmitter system for transmitting an optical signal; an optical amplifier system for receiving an optical signal from the transmitter and for amplifying and outputting the optical signal, the optical amplifier system comprising a surge control unit for controlling a light surge which may occur therein so that the strength of the optical signal inputted to the optical amplifier system is not more than 16 dBm; and a receiver for receiving the amplified optical signal output from the optical amplifier system.

The above objects are also achieved by an optical transmission system which performs long distance signal transmission, comprising: a transmitter system for transmitting an optical signal; an optical amplifier system for receiving the optical signal from the transmitter and for amplifying and outputting the optical signal, the optical amplifier system comprising an optical amplifier unit supplied with energy by pumping light for amplifying the multiplexed optical signal with the pumping light and a gain control unit for controlling a gain of the optical amplifier unit depending on the strength of the optical signal inputted to the optical amplifier unit, the gain control unit controlling the optical amplifier unit so as to have a maximum gain at a predetermined value of the strength of the inputted optical signal and a positive gain below the maximum gain in a predetermined range of strength of the inputted optical signal below the predetermined value of the strength of the inputted optical signal; and a receiver for receiving the amplified optical signal output from the optical amplifier system.

The above objects are also achieved by an optical transmission system, comprising: an optical transmitter system for transmitting an optical signal; an optical amplifier system for receiving the optical signal from the transmitter and for amplifying and outputting the optical signal, the optical amplifier system comprising an amplifier unit supplied with energy by pumping light for amplifying the optical signal with the energy and a gain control unit for controlling a gain of the optical amplifier unit depending on the strength of the optical signal inputted to the optical amplifier, the gain control unit controlling the optical amplifier system so as to have a maximum gain at a predetermined value of not more than −20 dBm of the strength of the inputted optical signal and a positive gain below the maximum gain in a predetermined range of strength of the input optical signal below the predetermined value of the strength of the inputted optical signal; and a receiver for receiving the amplified optical signal output from the optical amplifier system.

The above objects are also achieved by an optical transmission system comprising: a transmitter system for transmitting an optical signal; an optical amplifier system for receiving an optical signal from the transmitter system and for amplifying and outputting the optical signal, the optical amplifier system comprising an amplifier supplied with energy by pumping light for amplifying the optical signal with the energy and a gain control unit for controlling a gain of the optical amplifier depending on the strength of the optical signal inputted to the optical amplifier unit, the gain control unit forcibly decreasing the strength of the optical signal outputted from the optical amplifier system for a period of time from the time when the strength of the inputted optical signal indicates a value below a predetermined value for more than a predetermined time to the time when the strength of the inputted optical signal indicates a value above the predetermined value; and a receiver for receiving the amplified optical signal output from the optical amplifier system.

DETAILED DESCRIPTION OF THE PREFERRED EMBODIMENTS

The present invention will be described below with respect to FIGS. 1–40.

A method of controlling an optical amplifier unit according to the present invention will be explained before description of a specified composition of the present invention.

As described above, consumption control of energy accumulated excessively in the optical amplifier unit and measures therefor rather that the control speed are required to suppress a light surge in the optical amplifier unit surely and actually.

A first cause of light surge generation is that when the strength the input optical signal to the optical amplifier is small, excessively accumulated energy is maintained in the optical amplifier unit.

A second cause is that the amplification response speed of the optical amplifier unit is essentially low even if the supply of energy from a pump source is instantaneously intercepted to suppress the generated light surge. Thus, the strength of the optical output from the optical amplifier unit cannot be instantaneously decreased.

This method effectively detects a sign phenomenon of the optical amplifier unit which will be a factor of the light surge and suppresses an increase in the light surge.

Figure 1:
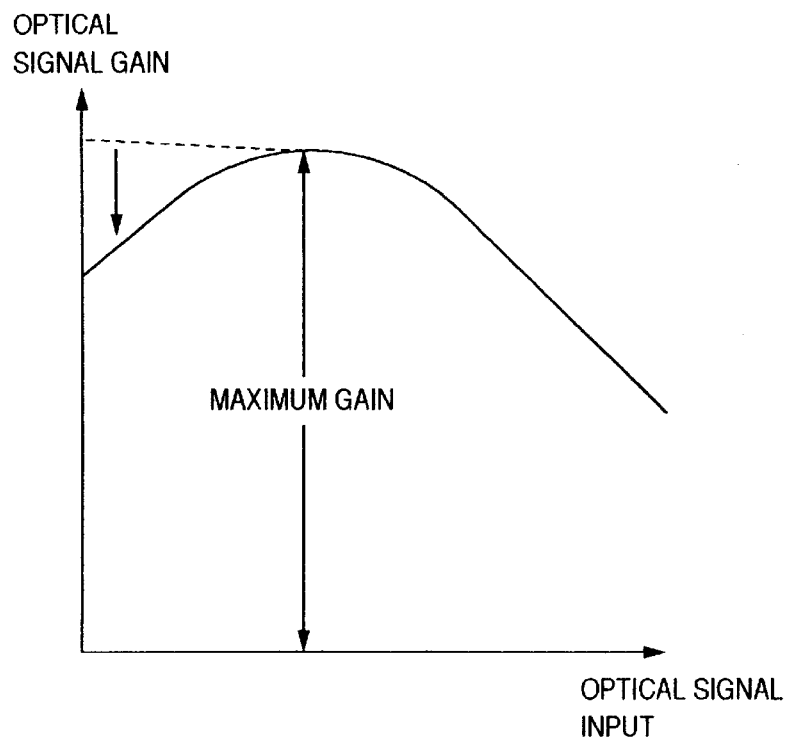
FIG. 1 shows a basic characteristic of an optical amplifier system according to the present invention.
Figure 2:
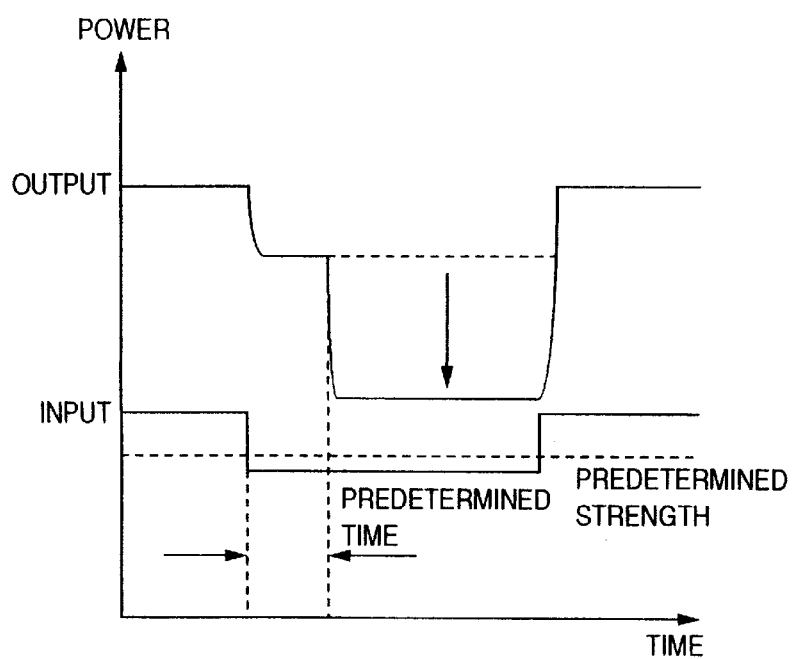
FIG. 2 shows another basic characteristic of the optical amplifier system according to the present invention.
Figure 3:
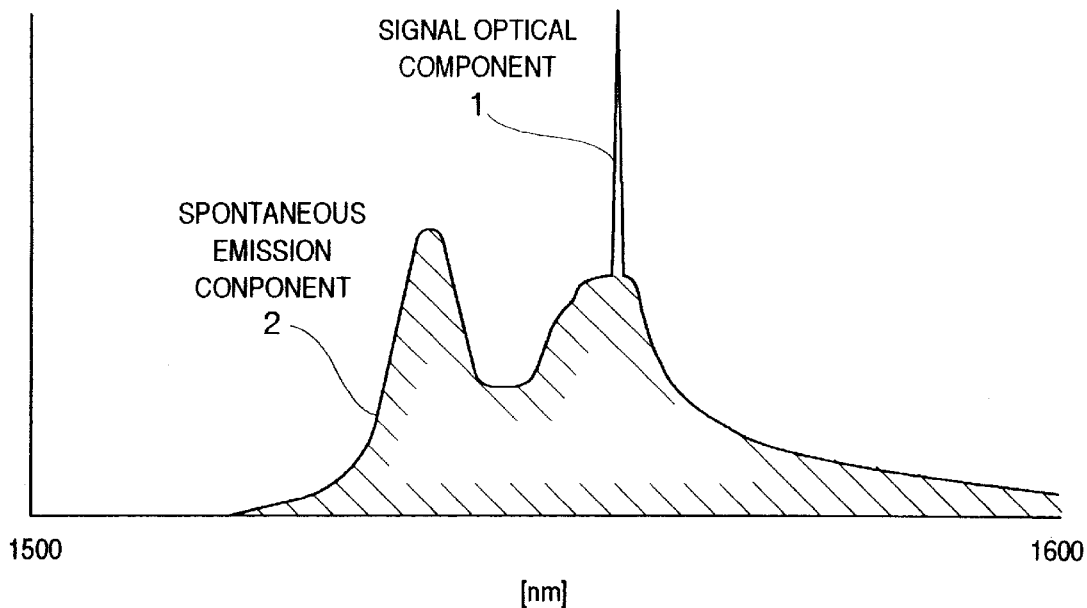
FIG. 3 shows a further basic characteristic of the inventive amplifier system.

FIGS. 1, 2 and 3 each show a first basic state of the method of controlling the inventive optical amplifier unit.

First of all, FIG. 1 shows the relationship in strength between an output and an input optical signal from the optical amplifier.

The optical amplifier unit is controlled such that the gain of the strength of the output optical signal from the optical amplifier unit to the strength of its input optical signal has a maximum gain at a predetermined value of the strength of the input optical signal and has a gain below the maximum gain for a predetermined range of strength of the input optical signal below the predetermined value.

In general, there are many cases where a range of the input optical signal to the optical amplifier unit is prescribe to maintain normal signal transmission and to find an abnormality in an early stage in the optical amplification of the optical transmission system. Even when the strength of the input optical signal is below a predetermined one, some degree of the optical signal gain is occasionally maintained in consideration of a system margin, etc. If the gain amplification factor of the optical amplifier unit is maintained as in the regular operation when the optical signal falls below the predetermined range, excessive energy is accumulated in the optical amplifier unit, which would be a cause of generation of a light surge.

According to the present invention, a light surge is prevented from occurring by suppressing the accumulated energy in the range of input strength where excessive energy accumulation occurs. Moreover, a safe, high-reliability optical amplifier unit controlling method is realizable without impairing performance, etc., such as the gain amplification factor of the prior art optical amplifier unit in a range of input optical signal strength above the predetermined value in which the optical signal is to be amplified normally.

Generally, the optical signal gain tends to gradually increase minutely as the strength of the input optical signal decreases, as shown by a dotted line of FIG. 1. Therefore, if the signal optical gain decreases below the dotted line gain, the effect of the present invention is obtained.

FIG. 2 shows an optical output pulse from the optical amplifier unit when an optical pulse is input to the optical amplifier unit.

The optical amplifier unit is controlled so that the optical output from the optical amplifier or the signal optical gain decreases, as shown in FIGS. 1 and 2 when the strength of the input optical signal to the optical amplifier unit is below the predetermined value and a range of time below a predetermined value exceeds a predetermined time.

For instance, in an area where the output optical signal strength decreases when the input optical signal strength decreases, the output optical signal strength is forcibly decreased when the decreased input optical signal strength is below a predetermined value and more than a predetermined time has elapsed.

Conventionally, the accumulated energy is decreased by decreasing the output optical signal strength indicative of a constant value relative to the input optical signal. The optical output increases again when the input optical signal exceeds the predetermined value again.

When the optical amplifier unit is used in the optical transmission system, a constant optical signal is not necessarily transmitted. The optical signal has a possibility that the optical signal will be intercepted instantaneously, for example, when an optical switch provided in the transmission route is switched and/or an optical connector is mechanically connected. If the time zone in which the optical signal is instantaneously intercepted is below a fixed time value, the energy accumulated in the optical amplifier unit is not maintained. If time more than the fixed time value has elapsed, the accumulated energy is maintained, which would be a cause of light surge generation.

According to this method, control of the optical amplifier unit is achieved without maintaining extra accumulated energy for a comparatively long instantaneous interception due to structural connection of an optical switch and the optical fiber etc., for instance. When the instantaneous interception which is caused due to unavoidable successively appearing "0's" of an optical signal data and a relatively short interval of time, a regular optical signal gain is maintained.

The optical output or the optical signal gain is not necessarily required to be changed discontinuously, but may be controlled so as to decrease continuously.

According to the present invention, a safe high-reliability optical amplifier unit controlling method is achieved without adversely affecting the characteristic of the prior art optical amplifier unit.

FIG. 3 shows an optical spectrum of the output light from the optical amplifier unit. The amplified optical signal 1 and optical noise elements called spontaneous emission light are output from the optical amplifier unit in a pumped state. An optical amount of this spontaneous emission component 2 depends on the pumping energy to the amplifier unit and the signal optical gain of the optical amplifier unit, and shows the amount of accumulated energy in the optical amplifier unit directly.

In the present invention, the optical amplifier unit is controlled so that the amount of spontaneous emission 2 of the optical amplifier unit may is below a determined maximum one.

In general, the amount of spontaneous emission of the optical amplifier unit often increases as the input optical signal strength decreases when the light is amplified in the optical transmission system. If the amount of spontaneous emission of the optical amplifier unit is maintained as in its regular operation when the input optical signal strength decreases, excessive energy is accumulated in the optical amplifier unit, which would cause a light surge.

According to the present invention, by suppressing the amount of spontaneous emission below a predetermined value, the accumulated energy is suppressed and a light surge is prevented from occurring. Moreover, the optical amplifier unit can be controlled without impairing its performance such as the gain amplification factor of the conventional optical amplifier unit in a range below the predetermined value in which the optical signal is amplified normally.

Description will below be made of one example of the composition of an optical amplifier system which includes a surge control unit which prevents the occurrence of a light surge, and more particularly an optical amplifier system which includes a gain control unit which controls the gain of the optical amplifier system as the features of the present invention. FIGS. 5, 6, 8, 9, 12, 15 and 16 omit the indication of the control unit for convenience' sake.

Figure 4:
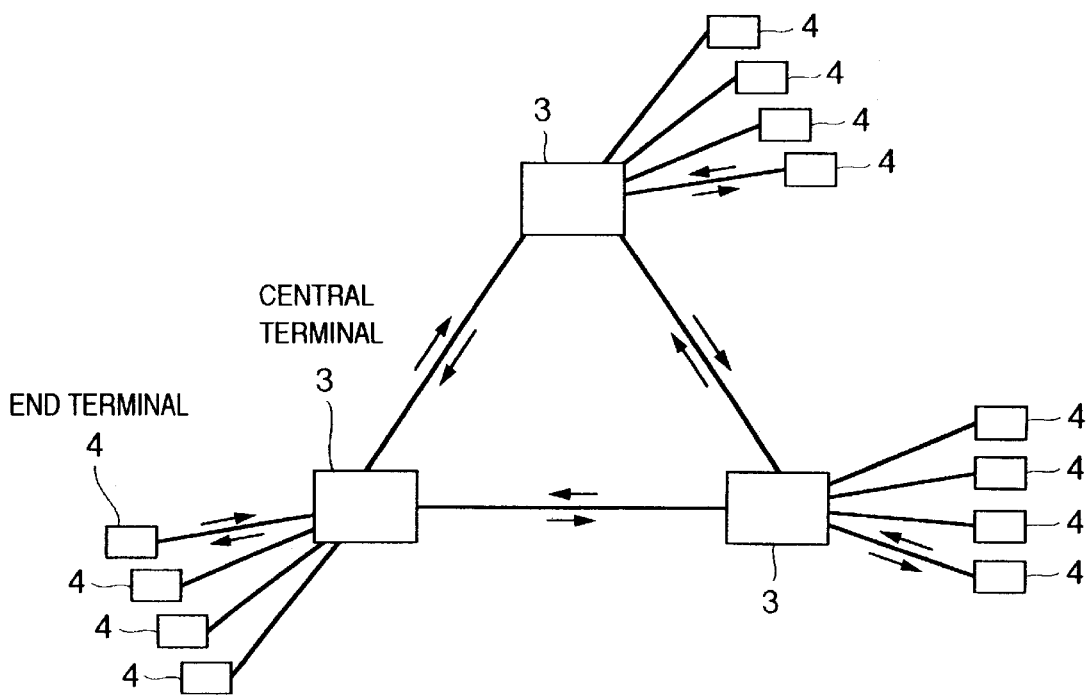
FIG. 4 shows a basic block composition of an optical transmission network according to the present invention.

FIG. 4 shows the optical transmission network where the optical amplifier unit control method shown in FIGS. 1, 2 and 3 is applied. The signal is transmitted by optical transmitter and receiver systems of central terminals 3 between the terminals. Optical multiplexing/demultiplexing transmission is performed from a central terminal 3 to each of related end terminals 4 and from each of the end terminals 4 to the related central terminal 3.

Figure 5:
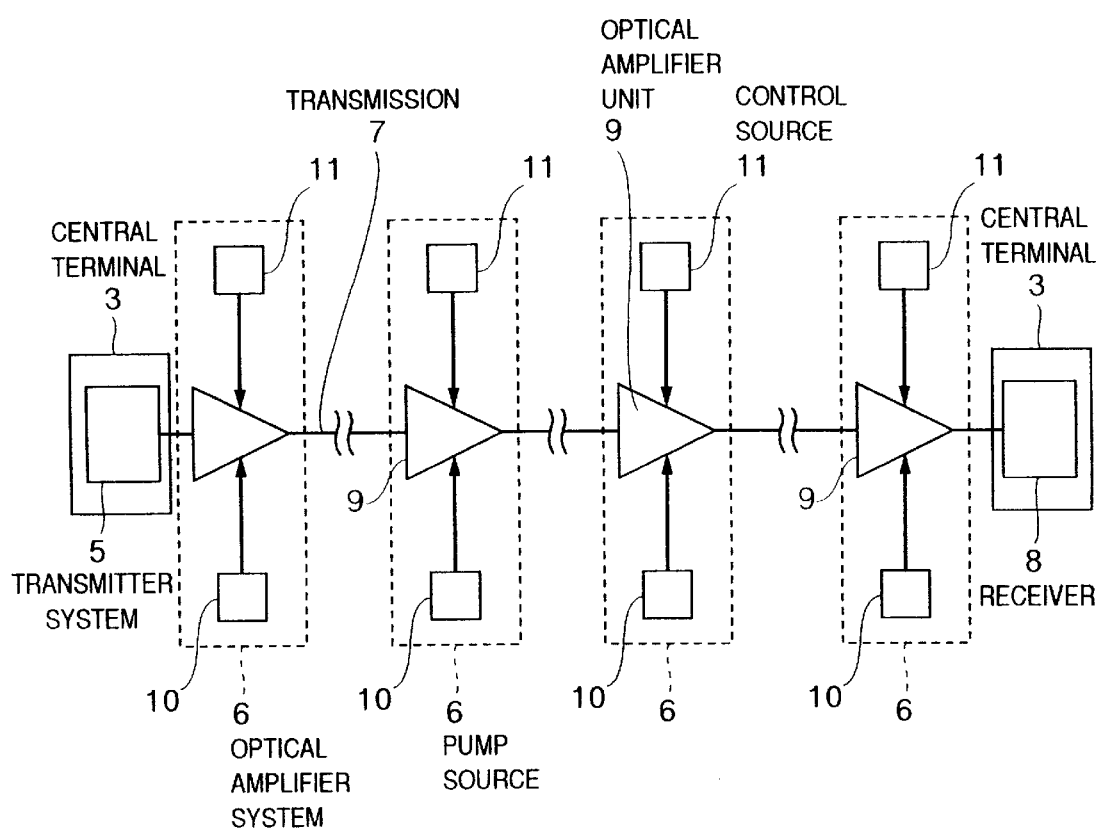
FIG. 5 shows another basic block composition of the inventive optical transmission system.

FIG. 5 shows a specified example, for example, of the optical transmission system applied between central terminals of an optical transmission network shown in FIG. 4. An optical transmission signal from an optical transmitter system 5 of a central terminal 3 is delivered to an optical amplifier system 6. The amplified optical signal from the amplifier system 6 is transmitted by a transmission fiber 7 and amplified by the amplifier system 6 to compensate for an optical loss caused in the transmission. In this system, the optical signal is again sent to an optical receiver 8 of a center terminal 3 via the transmission fiber 7 and an optical amplifier system 6.

The inventive optical transmission system includes a plurality of optical amplifier systems 6 each including a pump sources 10 which actively increases the gain of the optical amplifier unit 9. It is characterized that at least one of the optical amplifier systems 6 includes a control source 11 which actively decreases the gain of that amplifier system in a predetermined range of input strength, a predetermined range of time or a predetermined amount of spontaneous emission.

It is not necessarily required to cause the control source to act in a limited manner in the range of input strength, the range of time or the predetermined amount of spontaneous emission. Both the pump source and the control source may be caused to act actively in predetermined ranges while being adjusted.

For instance, when only the last-stage optical amplifier system 6 includes a control source, and when the gain is decreased actively in a range of input strength or time or in a predetermined amount of spontaneous emission, light surges due to all instantaneous interception of the input signal and optical pulses are suppressed effectively by the last-stage optical amplifier system 6.

All the optical amplifier systems 6 of the transmission system may each include a control source 11. In this case, preferably, all the optical amplifier systems 6 evenly control the suppression degrees of light surges and light surge ratio which is the ratio of normal optical output power to light surge peak in the respective amplifier systems. Whenever optical amplifier system 6 is passed, the suppression degree of the light surge or the light surge ratio is totaled. Therefore, if a control source 11 used in the present invention is provided in each of all the optical amplifier systems 6, and if the suppression degree or the light surge ratio is dispersed in a fixed value to the respective optical amplifier systems 6, the suppression degree or the light surge ratio is suppressed to within a lower fixed value. The risk of the optical transmission system is moderately dispersed at the same time.

Figure 6:
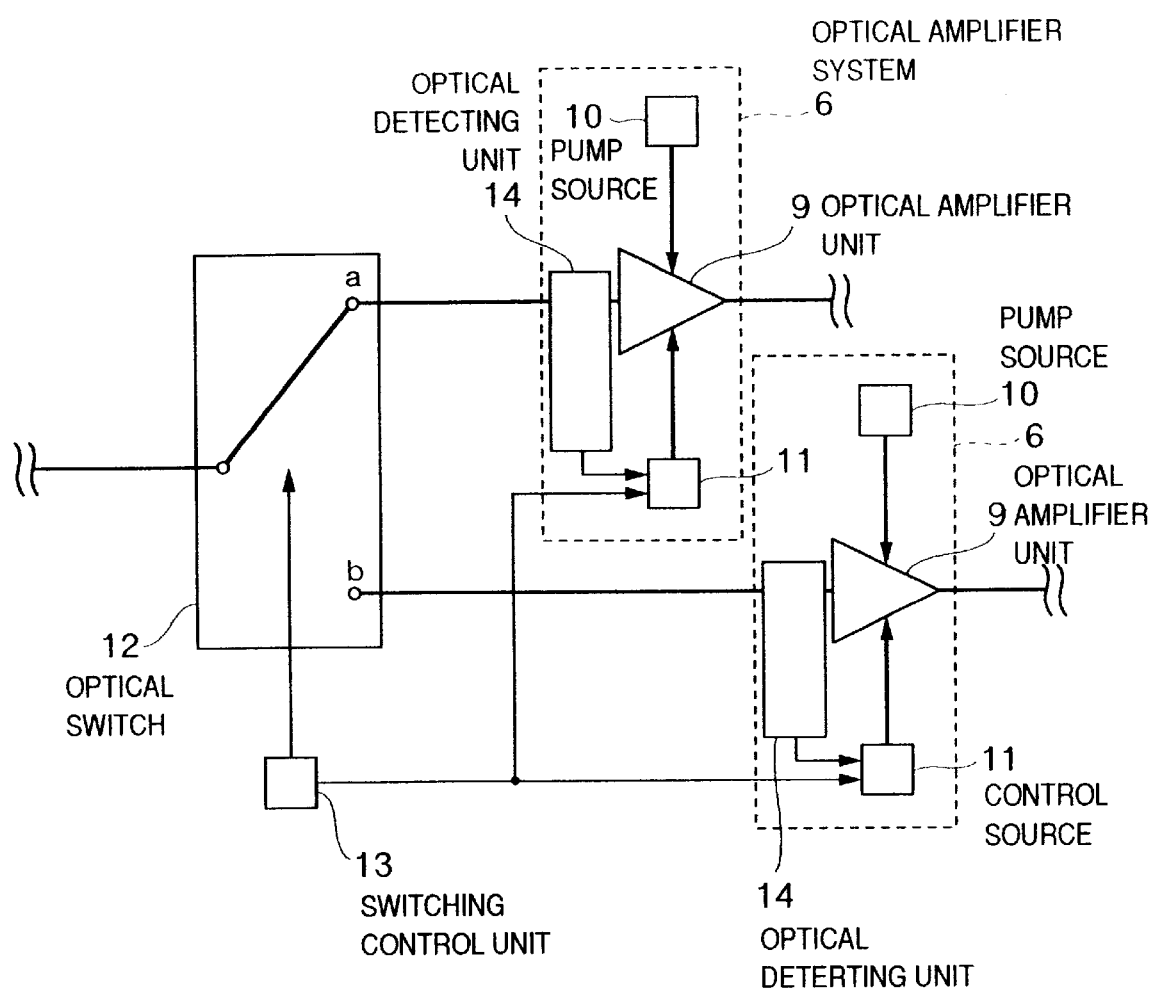
FIG. 6 shows a system composed of two optical amplifier systems and an optical switch.

FIG. 6 shows a combination of two optical amplifier systems and an optical switch applied, for example, to optical multiplexing and demultiplexing transmission of a central terminal 3 and end terminals 22 of the optical transmission network shown in FIG. 4.

In FIG. 6, an optical signal from a single transmission route is transmitted to either of routes a and b with the optical switch 12. The direction of the transmission is controlled by a switching control unit 13, the transmitted optical signal is amplified by the optical amplifier system 6 and sent to the transmission route. When a signal from an optical detecting unit 14 of the optical amplifier system 6 is in a predetermined range of input strength, a predetermined range of time or a predetermined amount of spontaneous emission, the signal gain of optical amplifier system 6 is actively decreased.

Figure 7:
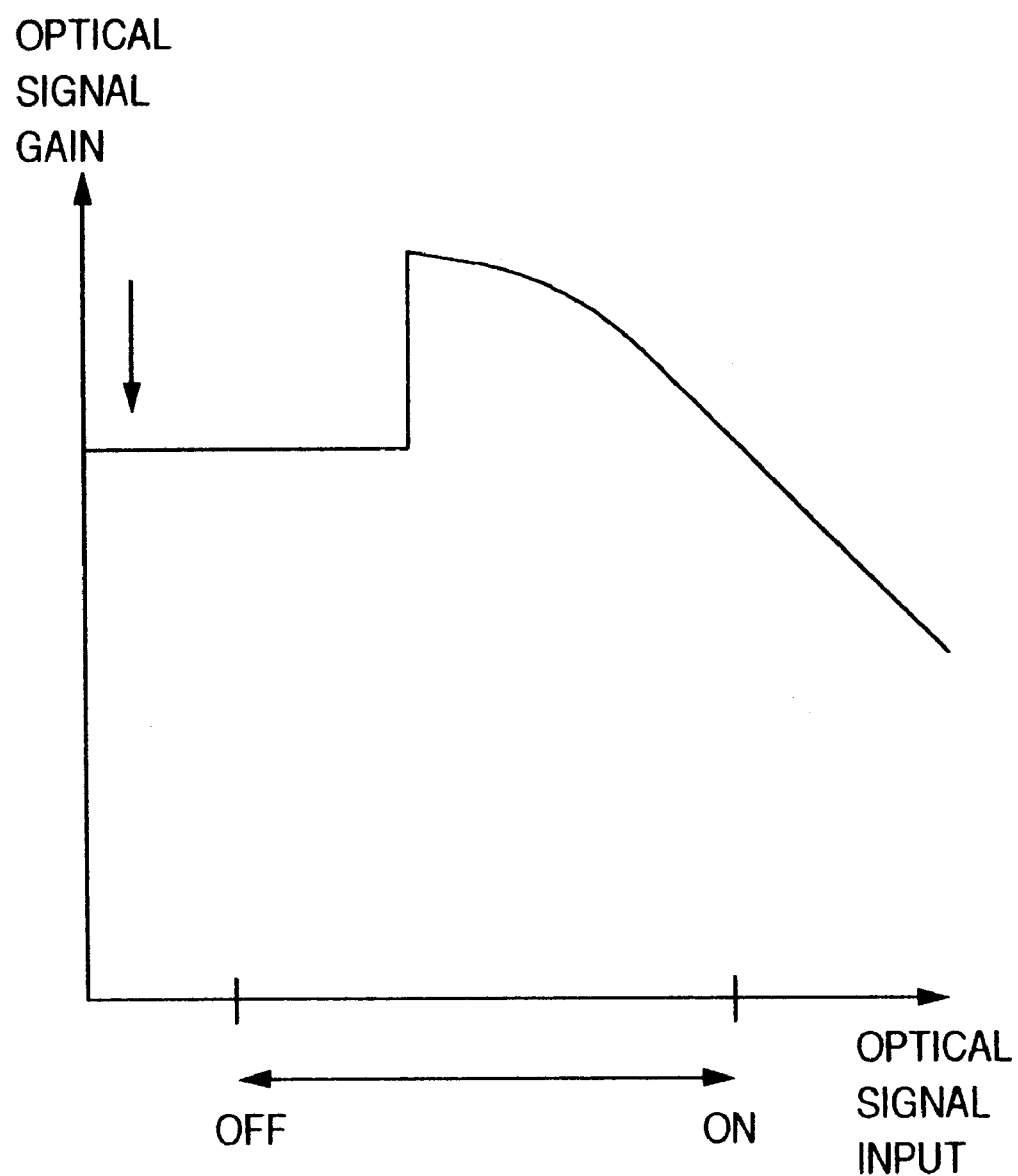
FIG. 7 shows a characteristic allowed in FIG. 6.

Conventionally, there is a possibility that a discontinuous state of the input light in the optical amplifier will be caused by the optical switch. A light surge generated in the optical amplifier system is suppressed by effectively detecting the discontinuous state or instantaneous interception of the input light. A) In this system, a zero optical input is given to the optical amplifier system located in a route with which the switch is not connected. An optical input to an optical amplifier system located on a route with which the switch is connected is often within a predetermined narrow range of strength. Therefore, a method of decreasing the gain discontinuously at a predetermined input strength, as shown in FIG. 7 may be employed because there is no actually continuous input range, as shown in FIG. 1. At this time, the optical output characteristic of the optical amplifier system is shown in FIG. 2. If the predetermined range of time is calculated from the switching time of the optical switch, surge suppression is more effective.

The method of detecting the discontinuous state of the input light is effective for detecting a sign phenominum of a light surge. When it is obvious that the discontinuous state or instantaneous interception of an optical input occurs due to connection or disconnection of the optical switch, it is more preferable that in place of the light surge being controlled depending on an actually transmitted input optical signal or a generated optical spontaneous emission, the control source used in the present invention is beforehand caused to act by detecting beforehand information obtained from the optical switch control unit disposed at the front stage of the optical amplifier unit.

Figure 8:
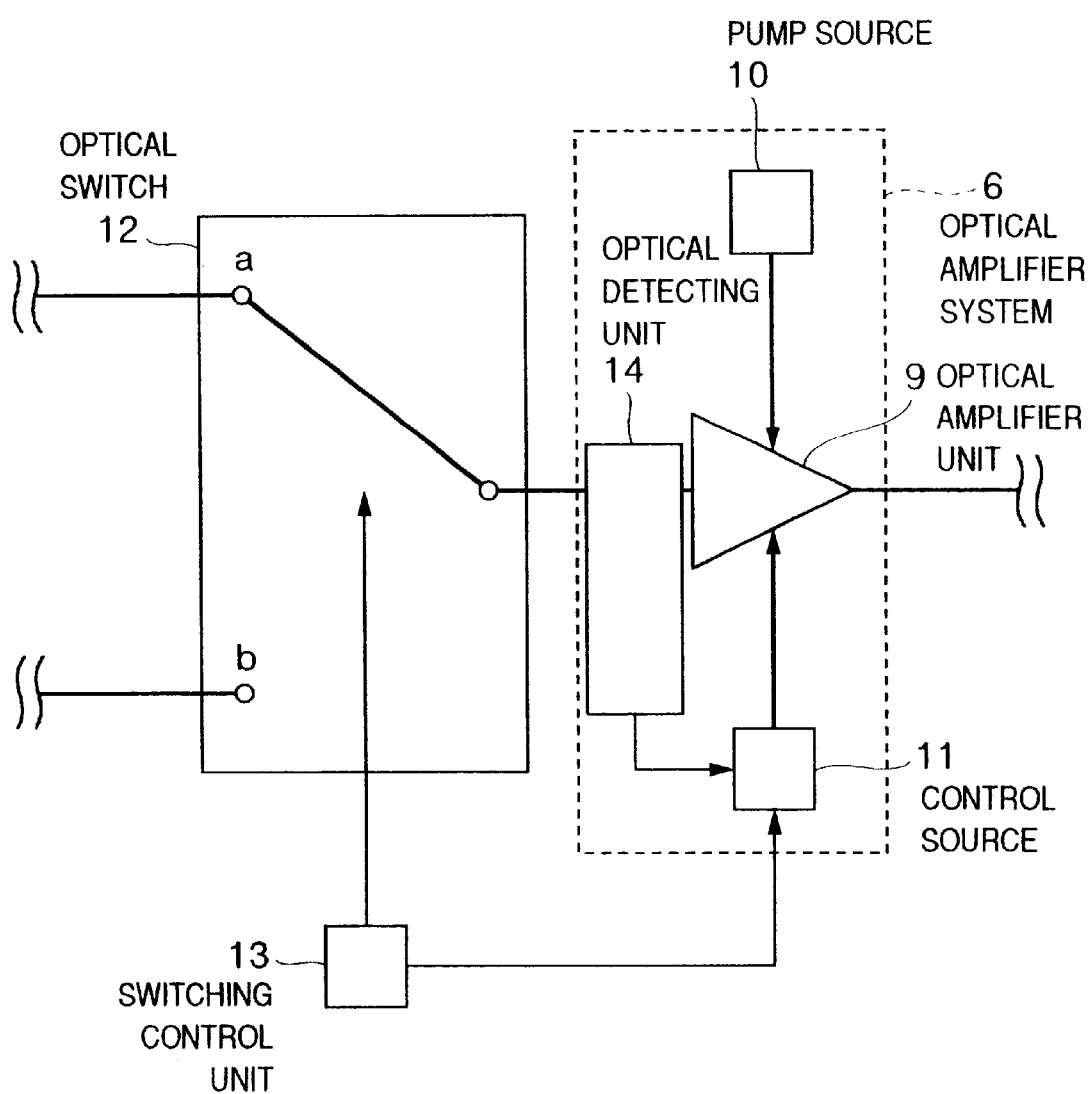
FIG. 8 shows another system composed of an optical amplifier system and an optical switch.

FIG. 8 shows a modification of the optical transmission system which includes a combination of the optical amplifier system and optical switch of FIG. 5. In FIG. 8, an optical signal from a transmission route a or b is transmitted to one fixed route by the optical switch 12. The direction of the signal transmission is controlled by a switching control unit 13. The transmitted optical signal is amplified by the optical amplifier system 6, and again introduced into the transmission route 23. The signal gain of the optical amplifier system 6 is actively decreased when the signal from the optical detecting unit 14 shows that the input optical signal is in the predetermined range of input strength, the predetermined range of time or the predetermined amount of spontaneous emission.

While there is a possibility that a discontinuous state of the input light will be caused by switching the optical switch, a light surge generated in the optical amplifier system 6 is suppressed by effectively detecting the discontinuous state or instantaneous interception of the input optical signal.

In this composition, a zero optical input is given to the optical amplifier system in a time zone in which the switch is not connected. After the switch is connected in the amplifier system, the optical input falls often within a predetermined narrow range of strength. Even when there is a difference in strength between the optical signals from the routes a and b, the respective strengths of the optical signals often fall within a narrow range of strength. Therefore, a method of decreasing the gain discontinuously in a predetermined input strength may be used, as shown in FIG. 7. At this time, the optical output characteristic of the optical amplifier system is shown in FIG. 2. If the predetermined time range is calculated from the switching time of the optical switch, surge suppression is more effective.

The method of detecting the discontinuous state of the input light is effective for detecting a sign phenominum of a light surge. When it is obvious that the discontinuous state or instantaneous interception of an optical input occurs due to connection or disconnection of the optical switch, it is more preferable that in place of the light surge being controlled depending on an actually transmitted input optical signal or a generated optical spontaneous emission, the control source used in the present invention is beforehand caused to act by detecting beforehand information obtained from the optical switch control unit disposed at the front stage of the optical amplifier unit.

Figure 9:
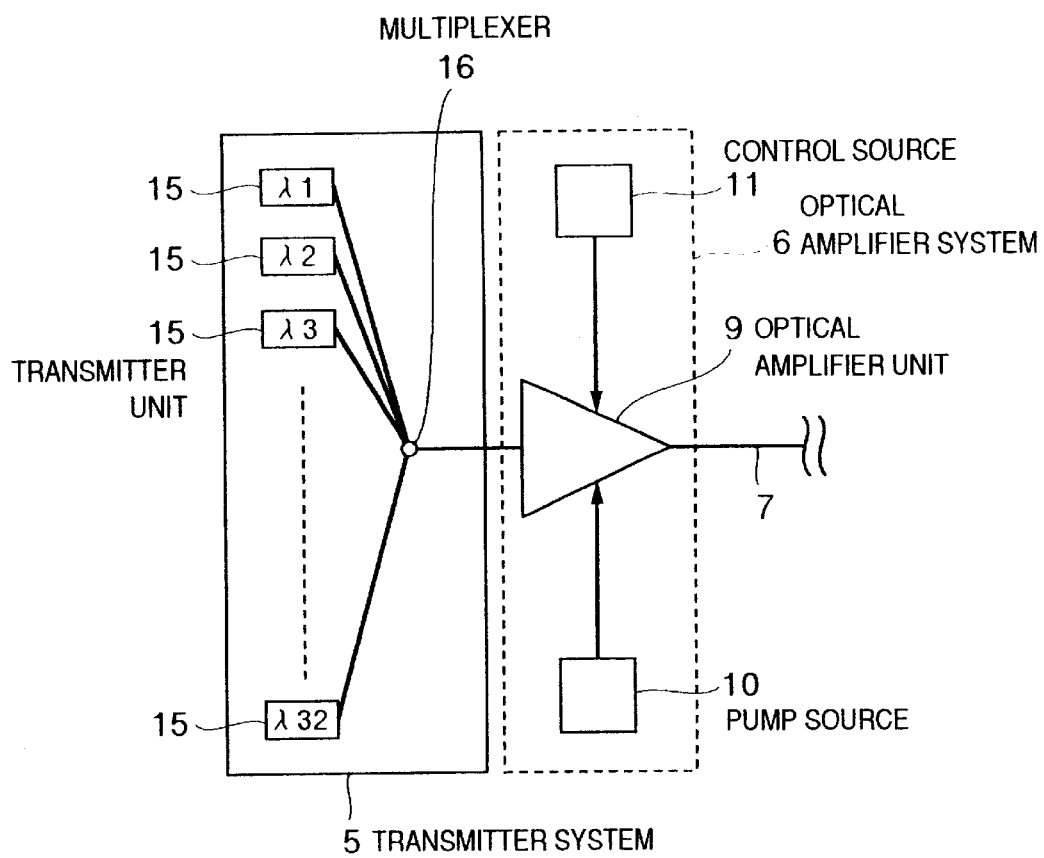
FIG. 9 shows still another system composed of an optical amplifier system and an optical transmitter system.

FIG. 9 illustrates an optical transmission system which includes a combination of the optical amplifier system 6 of FIG. 5 and an optical transmitter system 5.

The optical transmitter system 5 has a composition in which a multiplexer 16 multiplexes 32 wavelength signals from respective optical transmitter units 15 and transmits a resulting multiplexed signal to the transmission fiber 7. For instance, it is assumed that only one optical signal is in the state of use, and that signal input strength to the optical amplifier system is −5 dBm. The input level to the optical amplifier system is low because other signals are at a stop. When the signal light of the remaining 31 wavelengths is used under such a condition, 24 optical pulses are generated, which will be a cause of light surge generation. If all the signal strengths of the input pulses at this time are −5 dBm, the peak strength of the input pulses is +10 dBm.

Generally, the optical amplifier system provided after the optical transmitter system is often controlled so that the respective multiplexed optical outputs may reach a constant value. Therefore, the whole optical output strength of the optical amplifier system changes approximately 15 dB between when only one wavelength is used and when all of the 32 wavelengths are used.

When the input optical signal is in the predetermined range of input strength or in the predetermined range of time or in the predetermined amount of spontaneous emission, this composition actively decreases the signal gain of the optical amplifier system.

Figure 10:
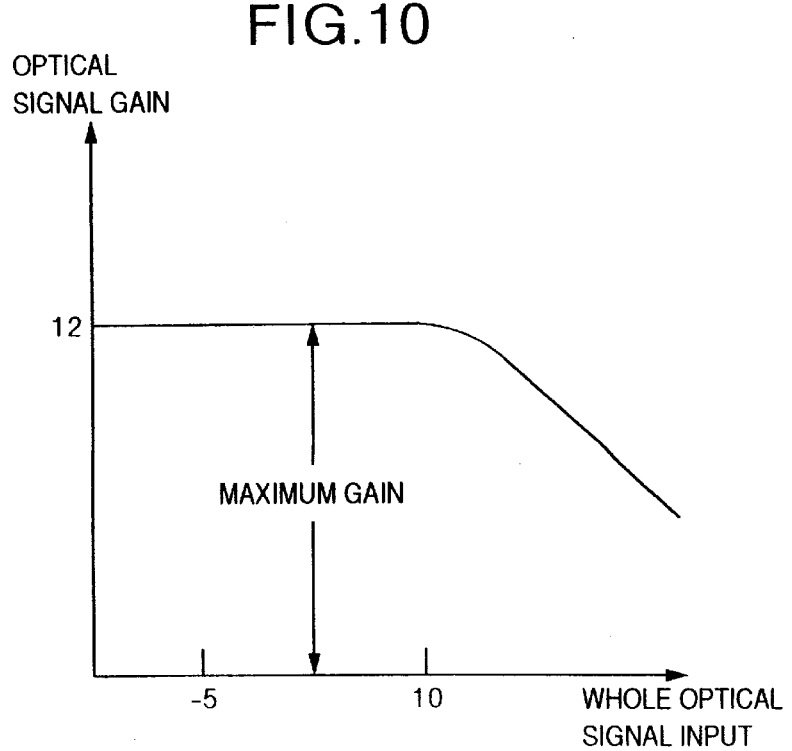
FIG. 10 shows the relationship between a whole optical signal input strength and a whole optical signal output strength of the optical amplifier system.

FIG. 10 shows the relationship between the whole optical signal input strength and whole optical signal output strength of the optical amplifier system in this composition. For instance, when the optical signal input strength of one wavelength is −5 dBm, the whole optical signal input strength of 32 wavelengths is approximately 10 dBm. It is assumed that the respective wavelengths are of the same strength. For instance, when the output strength of each wavelength is set at +7 dBm, the gain of the whole optical signal output strength to the whole optical signal input strength is fixed at 12 dB if the whole optical signal input strength is in a range of −5 to +10 dBm. In this composition, the gain is controlled at 7 dB by causing the control source to act, for example, below 0 dB of the whole optical input strength.

Figure 11:
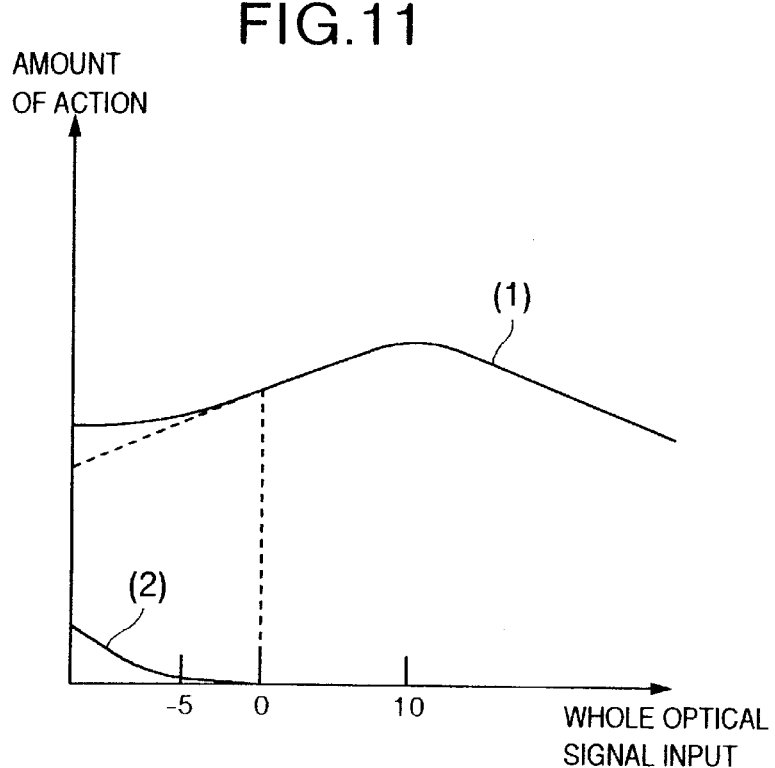
FIG. 11 shows the relationship between whole optical signal input strength and each of the amounts of action of a control source and a pump source of the optical amplifier system.

FIG. 11 shows each of the amounts of action of the control source and the pump source with the whole optical signal strength. The control source and the pump source show the actions which conflicts mutually. FIG. 11 shows in (1) that the amount of action of the pump source tends to slightly increase without monotonously decreasing below 0 dBm of the whole input light strength in order to achieve the characteristic shown in FIG. 11. FIG. 11 shows in (2) that the amount of action of the control source tends to increase below 0 dBm of the whole input light strength.

The characteristics shown in FIG. 11 may be realized by maintaining the amount of action of the pump source at a constant value, and changing the amount of action of the control source.

The control source is required to act from a predetermined value. For example, arrangement may be such that the control source may act always below +10 dBm of the whole input light strength. At this time, it would be advisable that when the input light strength is high, the amount of action of the control source should be minimized whereas as the input light strength decreases, the amount of action of the control source should increases gradually. By doing so, the light surge is suppressed without adversely affecting the noise figure of the optical amplifier system.

Alternatively, the control source may caused to act, for example, if it is detected that the number of waveforms used is below a predetermined number.

According to this system, the light surge generated in the optical amplifier system is suppressed by effectively detecting the discontinuity or instantaneous interception of the input light caused by the optical transmitter system.

Figure 12:
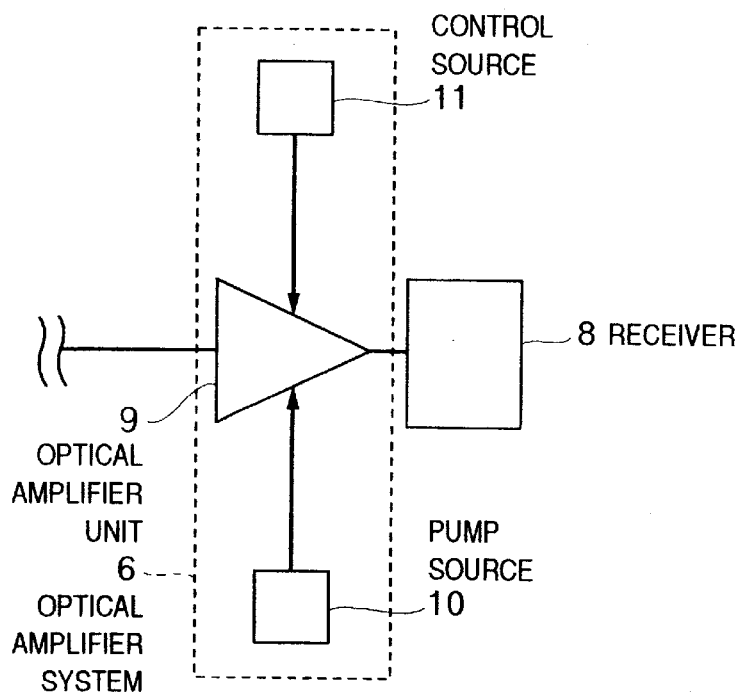
FIG. 12 shows still another system composed of an optical amplifier system and an optical receiver.

FIG. 12 shows a combination of the optical amplifier system of FIG. 5 and an optical receiver in the system.

The optical receiver 8 receives light directly from the optical amplifier 6 and its photodetector, etc., are most likely to be destroyed. For instance, optical soliton transmission is considered as an example of surely suppressing a light surge in the optical amplifier system located before the optical receiver. The optical soliton transmission is a method of transmitting the optical signal in the form of a pulse, equilibrating a non-linear effect inherent in an optical fiber and the effect of decentralization of the optical signal, and performing long distance signal transmission while maintaining the optical pulse. In this method, there are many factors of light surge generation due to a deterioration and a change, etc., in the signal waveform. Therefore, it is indispensable to have the optical amplifier which is capable of suppressing the light surge.

In this composition, the gain of the optical amplifier system 6 before the optical receiver 8 is actively decreased in a predetermined range of input strength or time.

According to this system, the optical amplifier system effectively suppresses the generation of light surges from all instantaneous interceptions of input optical signals and optical pulses occurring before the optical amplifier system are effectively suppressed. Thus, a stop of the functions of the whole system which may be caused by the destruction of and deterioration in the optical receiver is avoided.

Figure 13:
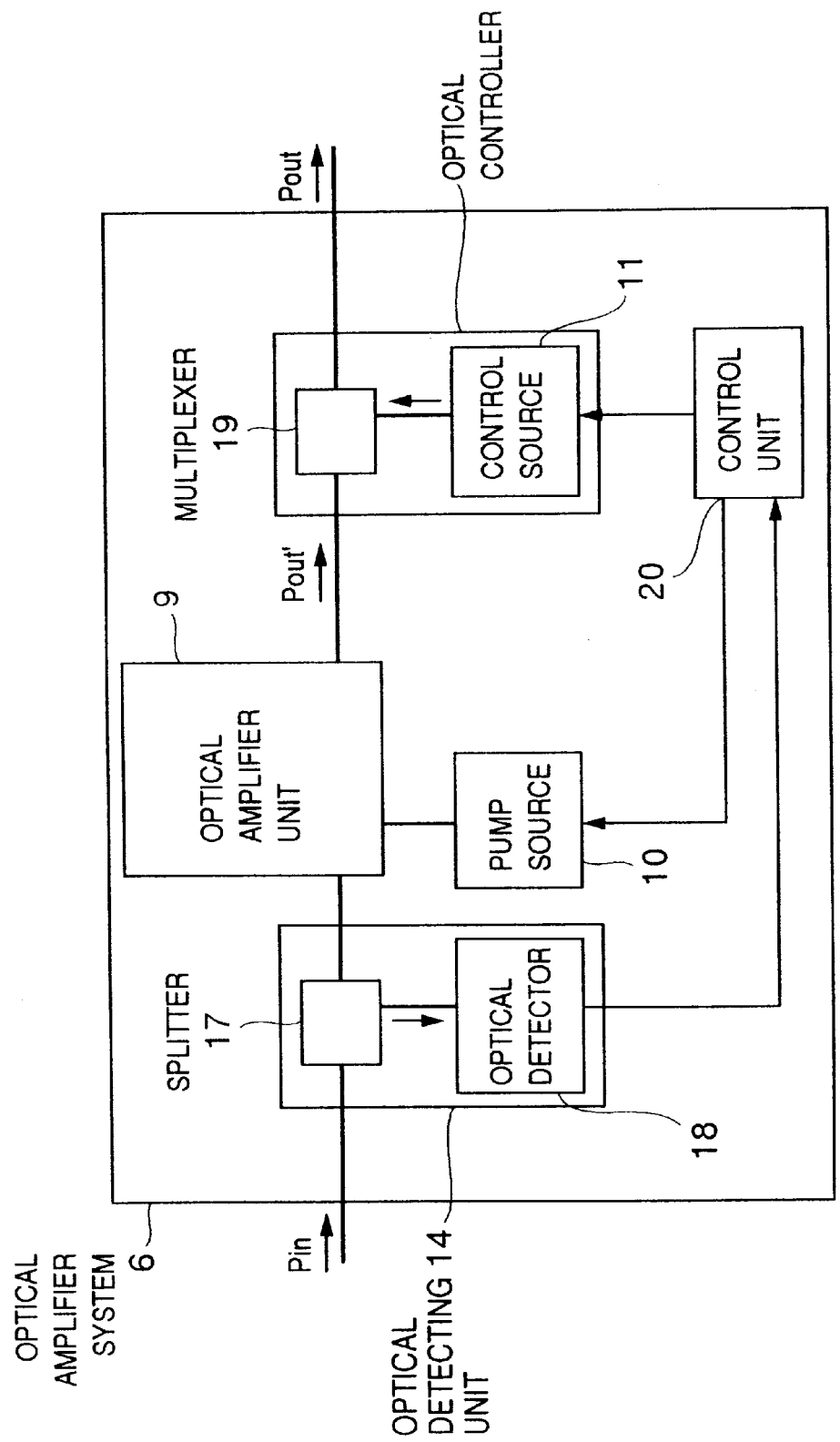
FIG. 13 shows a specified composition of one example of the optical amplifier system shown in FIG. 12.

FIG. 13 shows a specified example of the optical amplifier system. A part of the optical signal input to the optical amplifier system 6 separated by a splitter 17 of a detecting unit 14. An optical detector 18 detects the strength or change time of the input optical signal, using the separated light. The input optical signal which has passed through the splitter 17 is introduced along with pumping light from the pump source 10 into the optical amplifier unit 9. The optical amplifier unit 9 outputs an appropriate optical signal. Simultaneously, control light from the control source 11 in a control light introduction unit acts on the optical amplifier unit 9 via an optical multiplexer 19. The gain of the strength of the output signal from the optical amplifier unit 9 to the strength of the input signal input to the optical amplifier unit 9 is maximum at a predetermined value of the strength of the input optical signal. The control unit 20 controls the optical amplifier unit 9 so as to have a gain of less than the maximum gain in a determined range of the input strength below the predetermined value, using a signal outputted from the detecting unit 14.

Alternatively, when the optical strength of the input signal to the optical amplifier unit falls below the predetermined value and the range of time below the predetermined time value is above a predetermined time, the control unit 20 controls the optical amplifier unit so as to decrease an optical output from the optical amplifier unit or its optical signal gain, using the signal from the detecting unit 14.

This optical amplifier system maintains its inherent characteristics, and has high safety and reliability.

The pumping light or control light may be introduced from before and/or after the optical amplifier unit.

Figure 14:
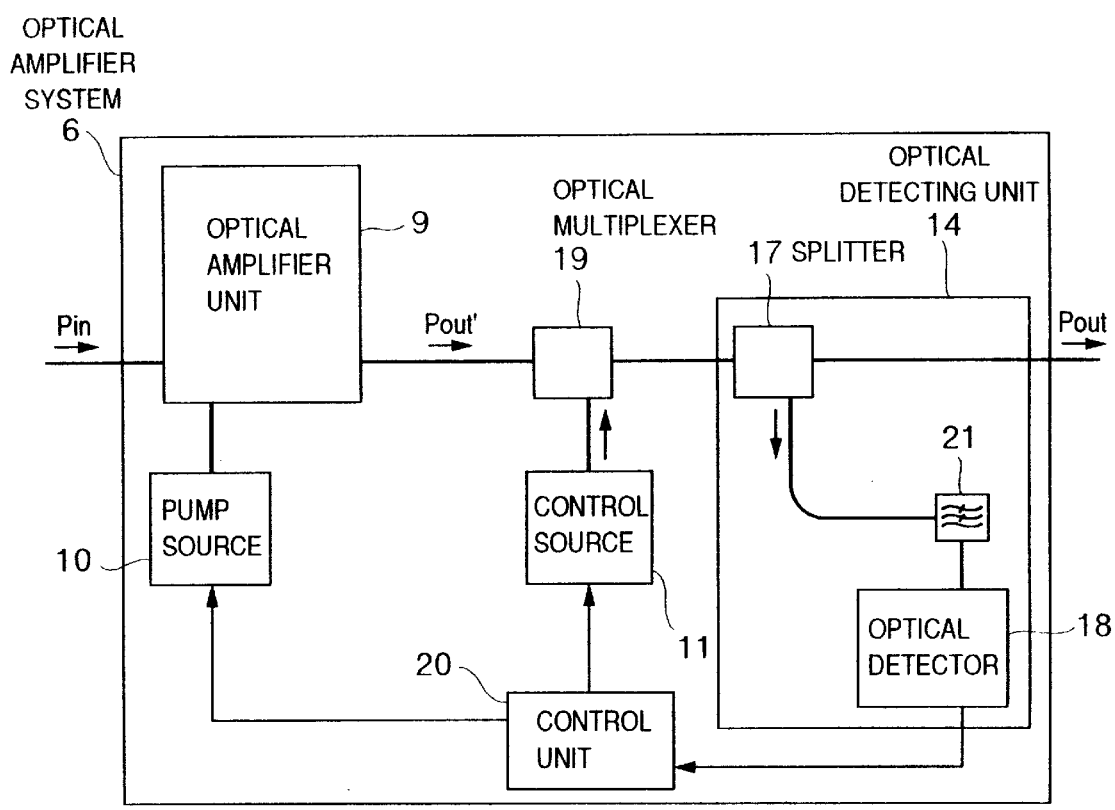
FIG. 14 shows another specified composition of one example of the optical amplifier system shown in FIG. 12.

FIG. 14 shows another specified example of the optical amplifier system. The optical signal input to the optical amplifier system is introduced along with pumping light from the pump source 10 into the optical amplifier unit 9, which outputs an optical signal. A part of the output light is separated by a splitter 17 of the detecting unit 14. The separated light is sent to an optical detector 18 through a band pass filter 21 which removes optical signal components, and the optical detector 18 detects an amount of spontaneous emission. Simultaneously, the control light from the control source acts on the optical amplifier unit via the optical multiplexer 19. The control unit 20 controls the optical amplifier unit so that the amplifier unit has an amount of spontaneous emission below a maximum predetermined amount of spontaneous emission, using the signal from the detecting unit 14. This optical amplifier system maintains its original characteristics, and has high safety and reliability.

The pump source light or the control source light can be introduced from one or both of the front and back of the optical amplifier unit. The positions of the detecting unit 14 and the multiplexer 19 for introduction of control source light may be reversed. While in FIGS. 13 and 14 the detecting unit is illustrated as being provided before or after the optical amplifier unit, the present invention is not limited to this particular case. The detecting unit may be provided at a point excluding on the transmission path where spontaneous emission leaking from the optical amplifier unit can be detected.

Figure 15:
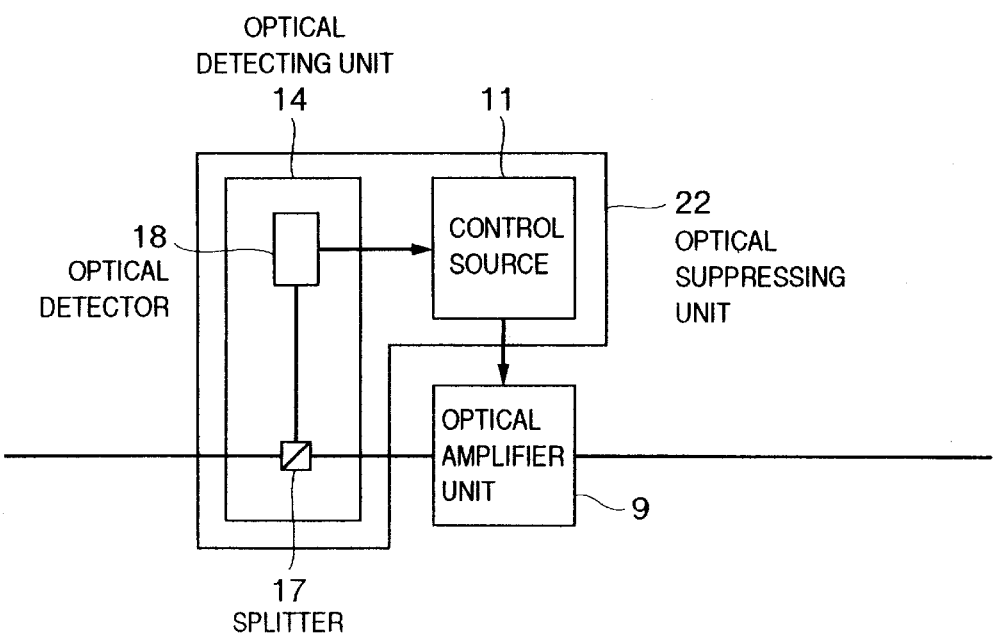
FIG. 15 shows a specified composition of one example of an optical suppressing unit.

FIG. 15 shows a specified example of an optical suppressing unit 22. The optical suppressing unit 22 is composed of a detecting unit 14 and a control source 11. A part of the optical signal inputted to the optical suppressing unit 22 is separated by a splitter 17 of the detecting unit 14. The optical detector 18 detects the strength or change time of the input optical signal. The control light from the control source 11 acts on the optical amplifier unit 9 at the same time, and the control light from the control source 11 is introduced into the optical amplifier unit 9 depending on the strength of the optical signal inputted to the optical amplifier unit 9.

Thus, according to the present composition, the optical suppressing unit 22 which can be easily added to the prior art optical amplifier system is provided. An accumulated energy detecting unit may be used in place of the input strength detecting unit. For instance, part of the output light from the optical amplifier system is separated by an optical splitter of the accumulated energy detecting unit. The components of the separated light other than the optical signal pass a band pass filter. The amount of light which passed the filter is detected by the optical detector, and transmitted to the control unit. The control light from the control source is introduced into the optical amplifier system through the introduction unit depending on the transmitted detected amount of the light.

Figure 16:
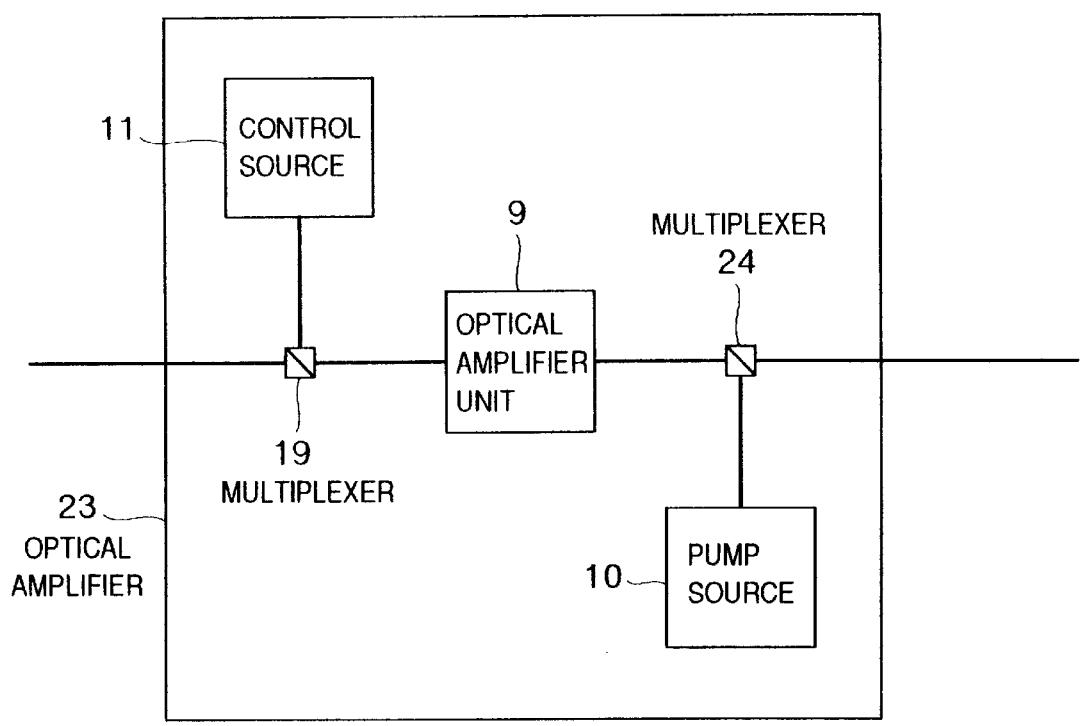
FIG. 16 shows a specified composition of one example of an optical amplifier.

FIG. 16 shows a specified example of an optical amplifier 23 of the optical amplifier unit. The optical signal inputted to the optical amplifier 23 is introduced along with the pumping light from a pump source 10 into the optical amplifier unit 9 via a multiplexer 24, and the optical amplifier unit 9 provides an output optical signal. Simultaneously, the control light from the control source 11 acts on the optical amplifier unit 9 via the optical multiplexer 19, and the optical amplifier unit 9 actively performs both the pumping and suppressing actions.

According to this composition, an optical amplifier of high safety and reliability which includes a combination of a braking function and a conventional optical amplifier system which only amplifies light.

The function of the control source will be explained in detail before a specified example of the control source is described.

Figure 17:
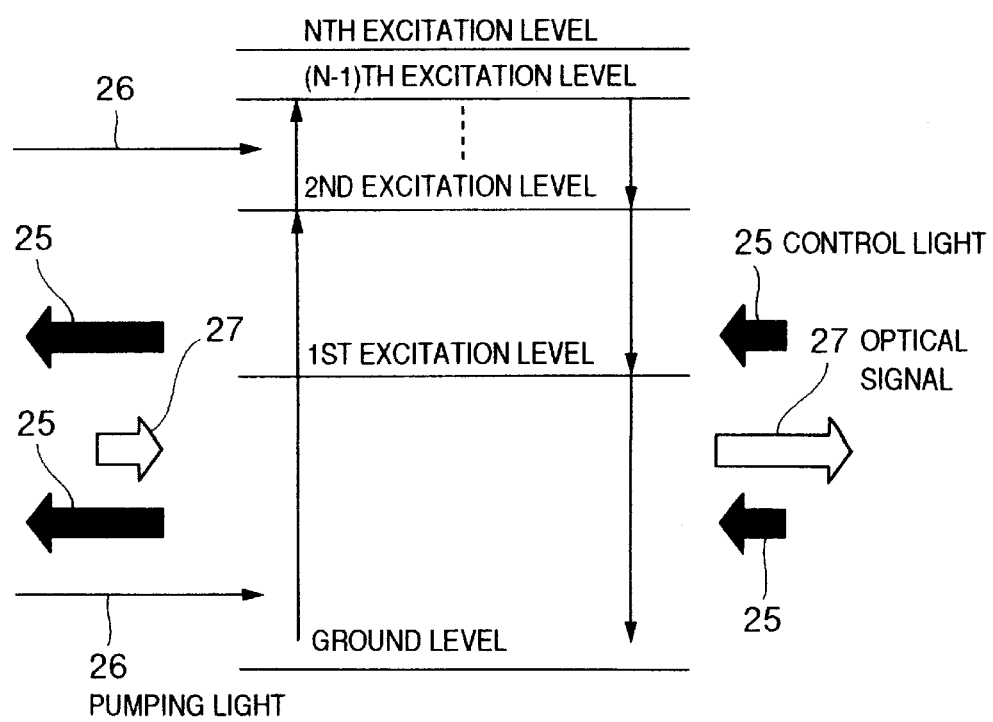
FIG. 17 schematically shows excitation levels of the optical amplifier unit.

FIG. 17 schematically shows pumping levels of the optical amplifier unit. The optical amplifier unit is pumped by pumping light 26 from the pump source from its ground level to an Nth excitation level and stored as accumulated energy, as shown. The atoms lifted to the Nth excitation level are lifted to a further upper level or again reaches the ground level through an intermediate level, depending on the energy of the pump source. To prevent a light surge from occurring when the optical signal 27 performs spontaneous emission, the control source used in the present invention actively consumes the accumulated energy which involves the spontaneous emission. Thus, the corresponding control light 25 preferably has wide-band wavelengths of 1500–1600 nm which cause spontaneous emission in the transition from the first excitation level to the ground level, or wavelengths which will consume light which is emitted in the transition from the Nth excitation level to an (N−1)th excitation level or an (N−2)th excitation level, . . . Alternatively, light having a wavelength by which light energy at the Nth excitation level is lifted temporarily to an upper excitation level may be used.

If, for example, light having wide-band wavelengths of 1500–1600 nm which cause spontaneous emission in the transition from the first excitation level to the ground level, and light having a wavelength in the transition from the Nth excitation level to the (N−1)th excitation level or the (N−2)th excitation level are acted simultaneously, the atoms at all the excitation levels are dropped momentarily to the ground level compared to generation of a light surge. Thus, as a result, the accumulated energy is rapidly consumed effectively.

It is effective to introduce light having wavelengths which involve as many level transitions as possible to consume the accumulated energy effectively.

Figure 18:
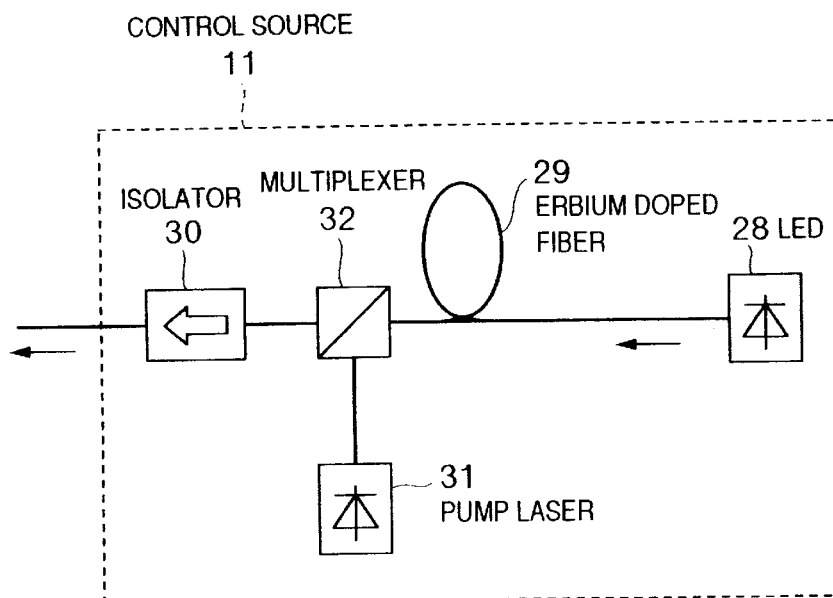
FIG. 18 shows a specified composition of one example of a suppression source of FIG. 16.

FIG. 18 shows a specified example of the control source 11. In the control source 11, an erbium (rare earth element)-doped optical fiber 29 amplifies light from an InGaAsP LED 28 which has a light emission wavelength in a 1.5 μm band, and an optical isolator 30 suppresses return light to thereby provide control light. The pumping light from a 0.98 μm pump laser 31 as the pump source which pumps the rare earth element optical fiber 29 is introduced into the fiber 29 by a multiplexer 32.

According to this composition, control light having satisfactory optical power and a wide wavelength band is provided. The LED has high reliability compared to the pump lasers, and the 0.98 μm pump laser also provides a low outout, is inexpensive, and provides satisfactory required power. Thus, an inexpensive high-reliability control source is provided.

In general, optical components of a wide wavelength which are spontaneous emissions are derived only by pumping a rare earth element-doped optical fiber with the pump source. Therefore, if the rare earth element-doped optical fiber produces sufficient spontaneous emission power, the LED is not required. Although the LED may be a pump laser, it need not be a laser of a single mode like the optical signal, but may be a laser of another mode oscillation. Adjustment of the power in the control source may be made by either of the 0.98 μm pump laser and the LED.

A semiconductor amplifier may be used instead of the rare earth element-doped optical fiber and the pump source, and the multiplexer into which the pumping light is introduced. At this time, the pump source provides a pumping current.

So long as the control source 11 is arranged so as to provide a sufficient optical power of a wide waveform band, the above-mentioned composition is not required.

Figure 19:
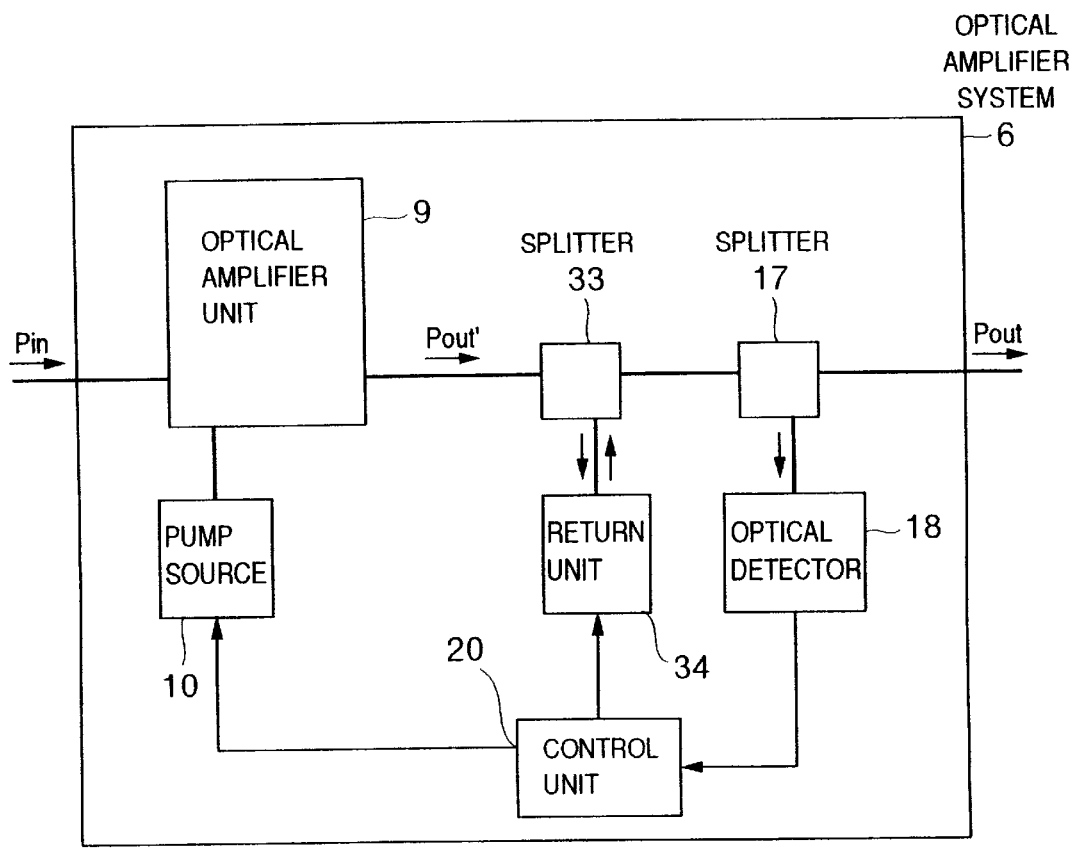
FIG. 19 shows a modification of the optical amplifier system of FIG. 18.

FIG. 19 shows a modification of the optical amplifier system of FIG. 18 in which part of the output light from the optical amplifier unit is returned as control light. As shown in FIG. 19, generally, when the optical amplifier unit 9 is pumped by the pumping light from the pump source 10, an optical signal Pin inputted from the outside is amplified by the amplifier unit 9 and outputted as an optical output Pout' which mainly includes the optical signal. In the present invention, a splitter 33 for return light generation, and a splitter 17 used for detecting optical power Pout' which mainly includes the optical signal are provided on the path for the optical output Pout. A part of the optical output Pout' which has passed the splitter 33 is separated by the splitter 17. The optical detector 18 detects the optical power of the output Pout'. An optical signal which has passed the optical splitter 17 is obtained as an optical output Pout which mainly includes the optical signal from the optical amplifier system 6. On the other hand, a part of the optical output Pout' which mainly includes the optical signal from the optical amplifier unit 9 is separated by an optical splitter 33, and its optical power is adjusted by a return unit 34, and returned as return light to the optical amplifier unit 9.

Figure 20:
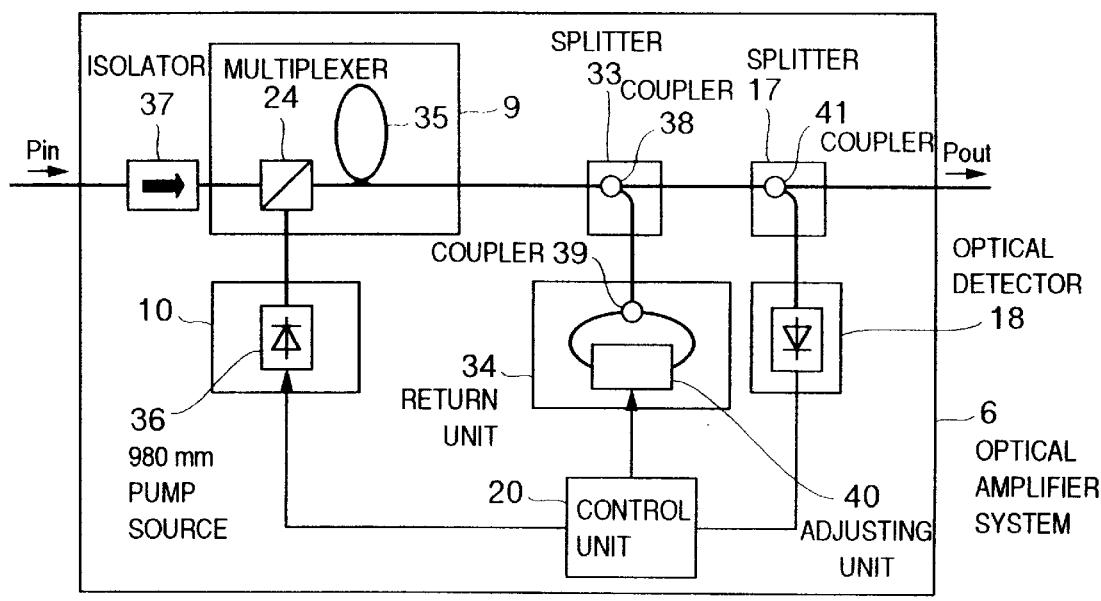
FIG. 20 shows a specified composition of the optical amplifier system of FIG. 19.

FIG. 20 shows a specified composition of one example of the optical amplifier system 6 shown in FIG. 19. As shown in FIG. 20, the optical amplifier unit 9 includes a multiplexer 24 and an erbium-doped optical fiber 35 disposed the multiplexer. The pump source 10 includes a 980 nm optical pump source 36. The pumping light from the 980 nm pump source 36 is introduced into the optical fiber 35 via the multiplexer 24. As a result, the optical signal Pin inputted from the outside passes an optical isolator 37, is amplified by the fiber 35 and outputted as the optical output Pout' which mainly includes the optical signal from the fiber 35. Part (3%) of the optical output Pout' is then separated by a splitting-coupler (a (3:97) optical coupler) as an optical splitter 33) 38 and processed by the return unit 34. The separated light from the optical coupler 38 is further separated by a (50:50) optical coupler 39 of the return unit 34 into two light portions which enter via corresponding routes into an adjusting unit 40 in opposite directions. The light adjusted by the adjusting unit 40 is output from the adjusting unit in opposite directions. This light is multiplexed again by the optical coupler 39, and returned to the fiber 35 as return light via the optical coupler 38. The return light is amplified by the fiber 35, and flows back to the input side. However, the backflow is obstructed by an optical isolator 37.

A further part of 97% of the whole Pout' which mainly includes the optical signal which has passed the splitter 33 is separated by a (5:95) optical coupler 41 as an optical splitter 17, and its optical power is detected by the optical detector 18. After all, in the present example, the optical output Pout which mainly includes the optical signal from the optical amplifier system is obtained as 92% of the whole optical output Pout' which mainly includes the optical signal. The 980 nm pump source 36 and adjusting unit 40 are controlled by the control unit 20 based on the detected optical power from the optical detector 18, as will be described later. Of course, only one of the pump source 36 and the adjusting unit 40 may be controlled. Alternatively, the control unit 20 may control the 980 nm pump source 36 and adjusting unit 40 without using the splitter 17 and the optical detector 18. The pumping light from the 980 nm pump source 36 increases the gain in optical fiber 35, and the return light from the return unit 34 decreases the gain.

Figure 21:
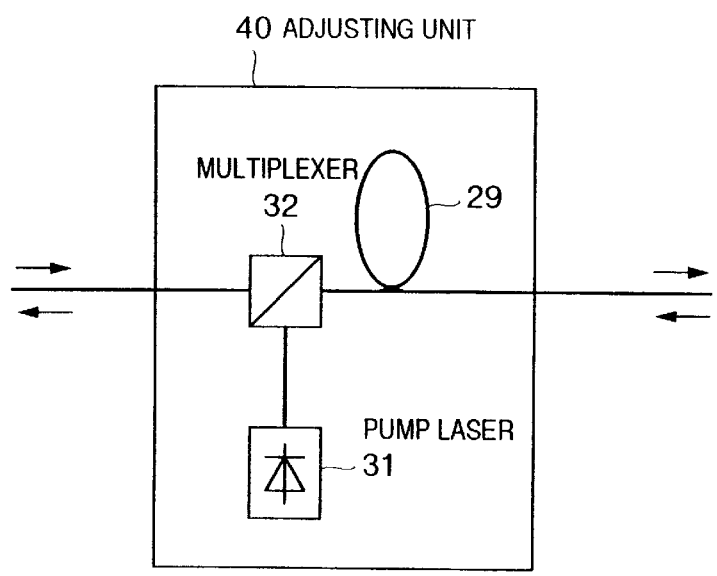
FIG. 21 shows a specified composition of one example of an adjusting unit of FIG. 20.

A specified composition of the adjusting unit 40 is shown in FIG. 21. As shown, the adjusting unit 40 is composed of an erbium doped optical fiber 29, a pump source having an oscillation wavelength of 980 nm (which may be an inexpensive low optical output) 31, and an optical multiplexer 32 which introduces pumping light. In this example, the required optical power of the return light is adjusted to a desired value only by increasing and decreasing the pumping light from the pump source 31. Light separated by the optical coupler 38 is used as it is as a part of the return light.

Generally, the optical amplifier unit which includes an erbium-doped optical fiber, etc., has a range of optical wavelengths of about 50 nm or more to be amplified or absorbed. One of the objects of the present invention is to efficiently consume the energy accumulated needlessly in the optical amplifier unit which includes the optical fiber, etc. Therefore, the return light preferably include amplified (absorbed) wavelengths of the optical fiber 29. The optical fiber 29 in the adjusting unit 40 used in FIG. 21 is to transmit, as the return light, light having a wide range of approximately 1520–1570 nm.

Figure 22:
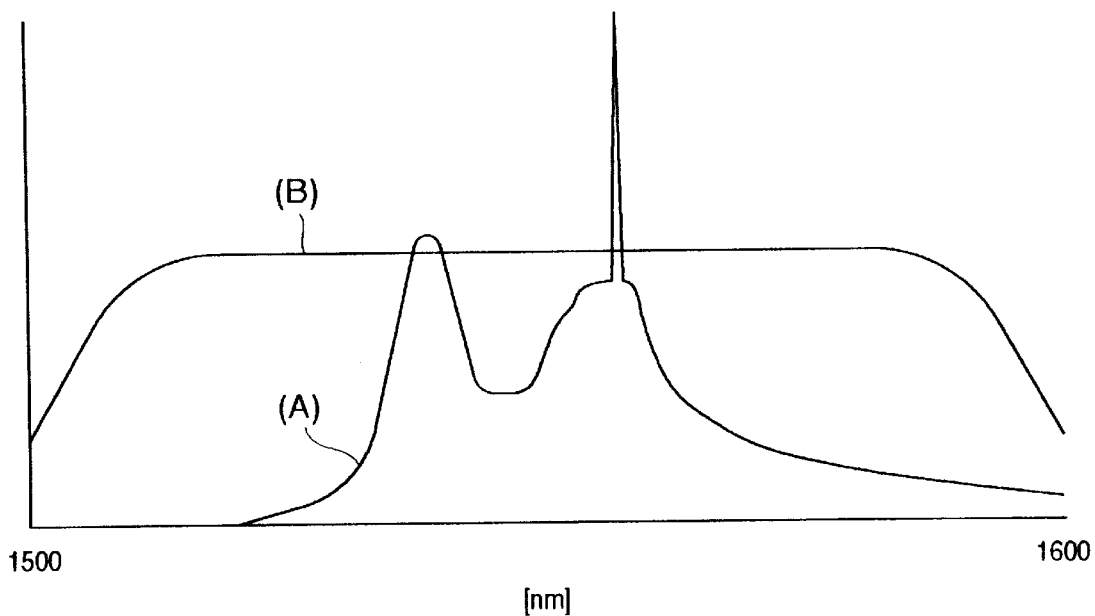
FIG. 22 schematically shows an optical spectrum of return light.

The outline of an optical spectrum of the transmitted return light is shown in (A) of FIG. 22. The wavelength band of the pump laser (LD) used as a normal optical signal is approximately 0.1 nm or less. In addition to the optical signal (of less than 0.1 nm), a desired optical spectrum as the return light is of at least 0.3 nm (in the present embodiment, approximately 1520–1570 nm) and approximately 2570 nm. More preferably, the optical spectrum is of 1500–1600 nm, as shown in (B) of FIG. 22. More strictly speaking, the use of the return light which has an optical spectrum similar to that of the erbium doped optical fiber 29 is preferred to cause the return light to contain the amplified (absorbed) wavelength of the erbium doped optical fiber 35. As will be easily presumed, even if the erbium doped optical fiber 35 of the optical amplifier unit 9 is replaced, for example, with a neodymium doped optical fiber whose optical spectrum is in a 1060 nm waveform band, a praseodymium doped optical fiber whose optical spectrum is in a 1300 nm waveform band, or an optical semiconductor amplifier, the optical spectrum preferably has an optical spectrum which similarly includes a respective one of the wavelength bands. Wavelength multiplexing amplification which multiplexes wavelengths of a plurality of optical signals (of not more than 0.1 nm) in the amplification band of an optical amplifier unit and which amplifies the resulting signal in an optical amplifier has recently been examined. In this case, the return light involved in the invention is effective for suppression of a light surge because it acts as return light having a wider wavelength band than a single optical signal (of 0.1 nm or less).

The erbium doped optical fiber and the optical amplifier unit fundamentally have the cause of light surge generation, as mentioned above. It is effective to increase the amount of the return light used in the present invention to suppress the light surge more effectively. On the other hand, an excessive increase in the amount of the return light would reduce the amplification gain efficiency. However, if the adjusting unit 40 of FIG. 21 is used, the optical output Pout' which mainly includes the optical signal increases, for example, the moment a light surge is generated in the erbium doped optical fiber 35 and its amount of light increases. A light surge is generated also in the erbium doped optical fiber 29 of the adjusting unit 40 in a mechanism similar to that of the fiber 35. According to FIG. 21, the amount of the return light is reduced to a small one by the adjusting unit 40 in the normal state and only when the light surge is generated, a sufficiently effective amount of the return light is produced.

Figure 23A:
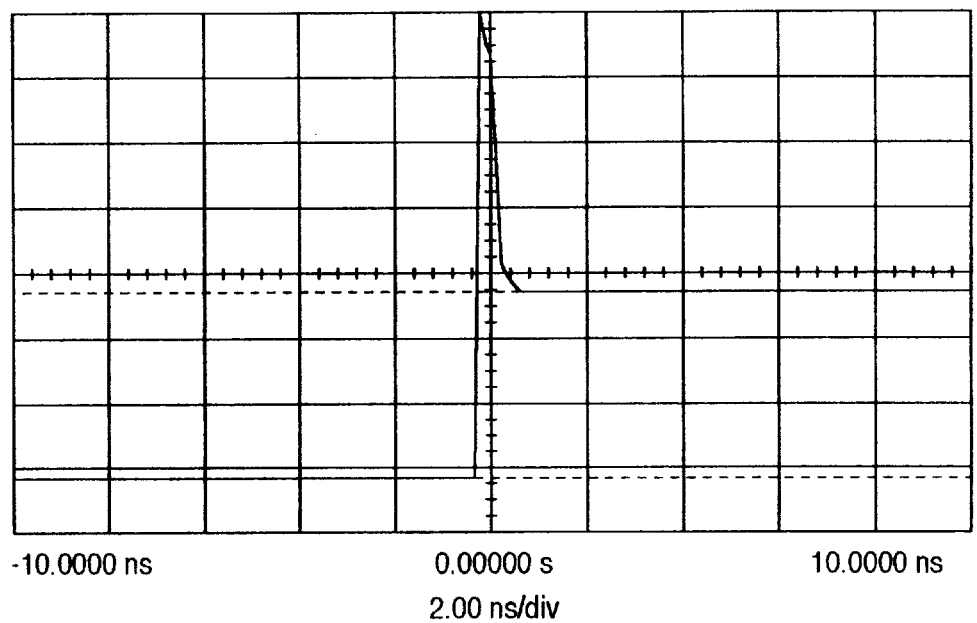
FIGS. 23A and 23B each show experimental data on an optical output from the optical amplifier system.
Figure 23B:
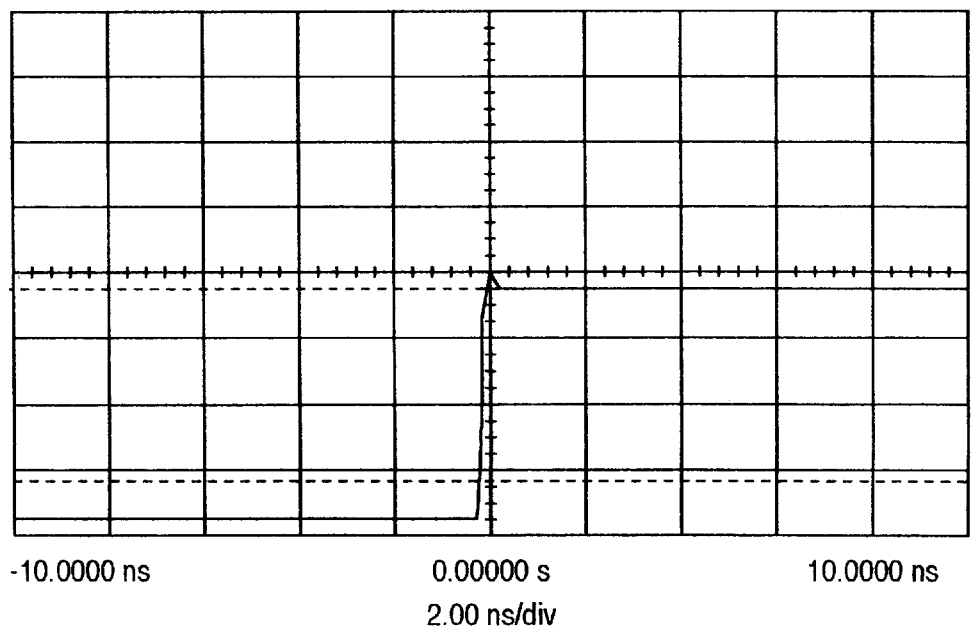

FIG. 23A shows an example of an light surge occurring when the control source is not used. FIG. 23B show measured data obtained when light surges are suppressed in the specified examples in FIGS. 20 and 21. It will be seen that the light surges are effectively suppressed by the present invention.

The length of the erbium doped optical fiber 29 in FIG. 21 was approximately 10 m, and the optical power of the 980 nm pump source was 20 mW. In order to suppress the light surge further, the length of the erbium doped optical fiber 29 and the optical output of the pump source are required to be increased or the splitting ratio of the optical coupler 38 is required to be reduced (for example, to 20:80) to increase the amount of the return light. Although the oscillation wavelength of the pump source has been illustrated as being 980 nm in the present example, a pump source having an oscillation wavelength near 530, 660, 830 or 1480 nm may be used if the fiber 29 is amplifiable. Especially for 530, 660 or 830 nm, a light emitting diode is usable. For the wavelength of 1480 nm, a low output light emitting diode is usable. Thus, elements having complex functions such as a temperature controller for the oscillation element may be omitted. As described above, the pump source used in the present example may be of an inexpensive low optical output type. Thus, for example, a part of the output of the pump source 36 acting on the optical amplifier unit 9 may be separated and introduced into the fiber 29.

In this respect, when the adjusting part 40 is composed as a semiconductor optical amplifier, the amplification factor of the semiconductor optical amplifier is controlled by a change in the pumping current. Thus, the optical power of the return light is adjusted.

Figure 24:
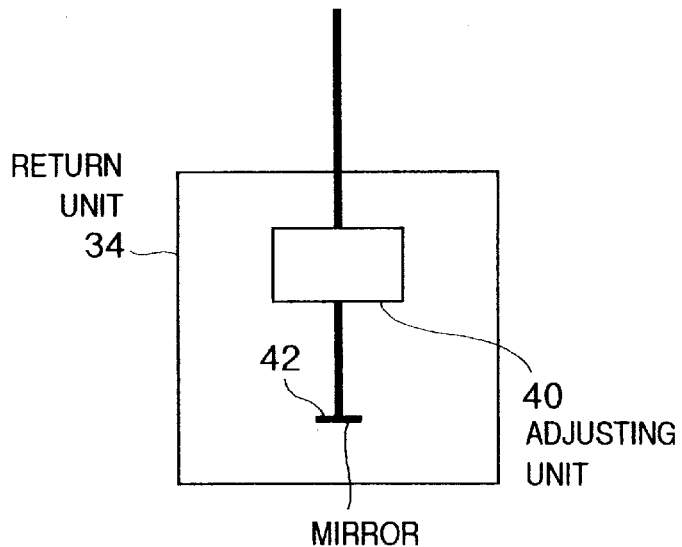
FIG. 24 shows a specified composition of one example of a return unit.
Figure 25:
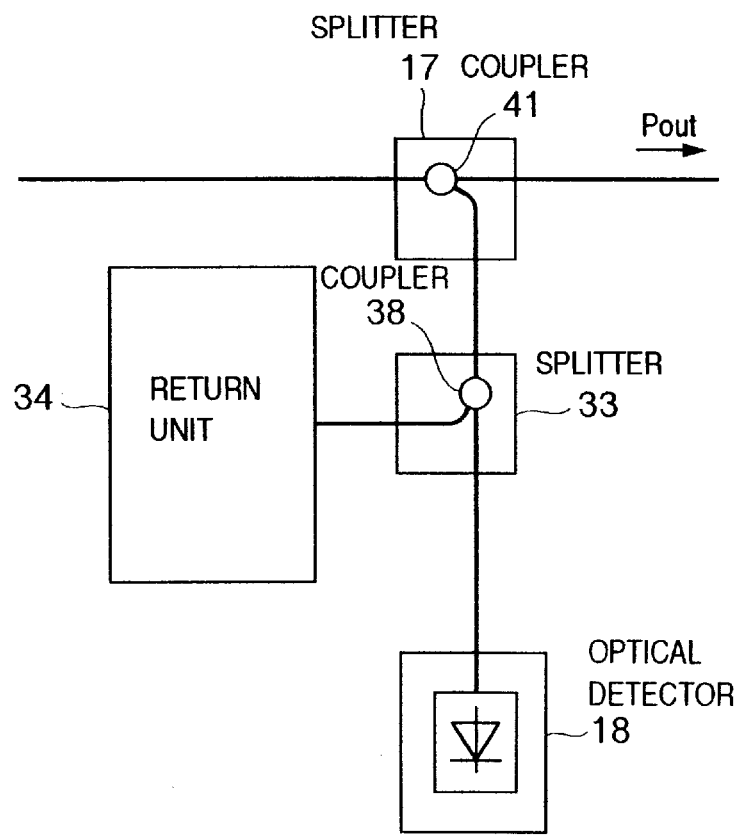
FIG. 25 shows a specified composition of circuitry involving the return unit.
Figure 26:
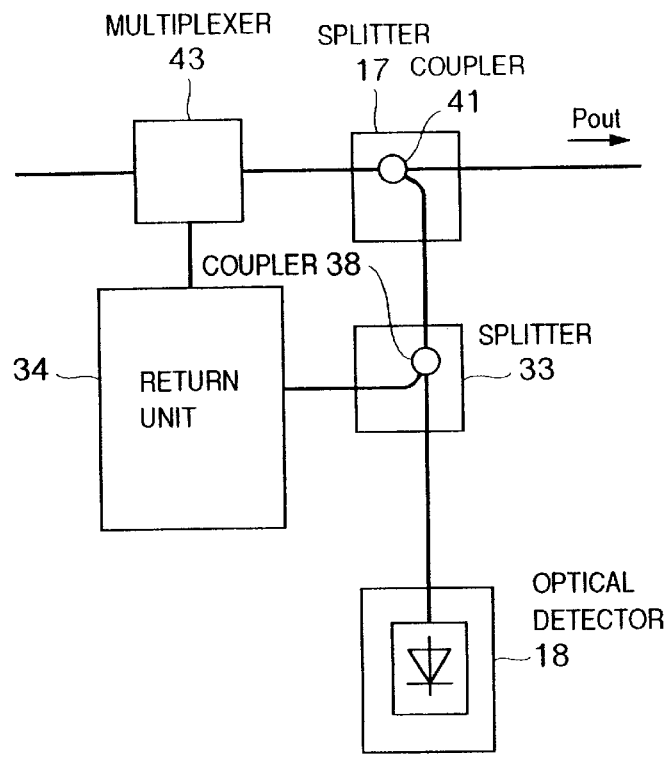
FIG. 26 shows a specified composition of another circuitry involving the return unit.

FIG. 24 shows another composition of the return unit 34. As shown, in the present example, the split light from the optical coupler 38 is supplied to a finished mirror face of the fiber 42 directly through the adjusting unit 40 and not through the optical coupler 39, reflected by the mirror face in the opposite direction to that of the supply of the split light, and then outputted again through the adjusting unit 40 to the return unit 34. That is, the return unit 34 is composed of a reduced number of components. By the way, the optical splitter 33 is required to be disposed between the optical splitter 17 and the optical detector 18, as shown in FIG. 25, to reduce the amount of light separated from the signal output Pout'. As shown in FIG. 26, as a further modification, the return light from the return unit 34 may be returned to the optical amplifier unit 9 through the optical multiplexer 43 and not through the optical spitters 33 and 17.

In the present composition, the return light is optically adjusted with the power of the optical output separated by the splitter and includes an optical feedback circuit different from an electric system. Thus, the method of suppressing the surge is very simple and never generates any light surge due to an electrical delay and/or the control method, etc.

The composition is more effective for wavelength multiplexing transmission. Because the multiplexed signal has an effect similar to that of return light with a wide band in the wavelength multiplexing transmission, the suppression degree of the light surge is further increased. For instance, in the wavelength multiplexed signal, a momentary increase in the number of multiplexed wavelengths from 2 to 32 would cause a light surge in the optical amplifier system. Also, in this case, the return light used in the present invention automatically suppresses the light surge and hence a steady wavelength multiplexing system is constructed.

According to this composition, a control source which has an optical strength enough for suppression of a light surge is provided.

Figure 27:
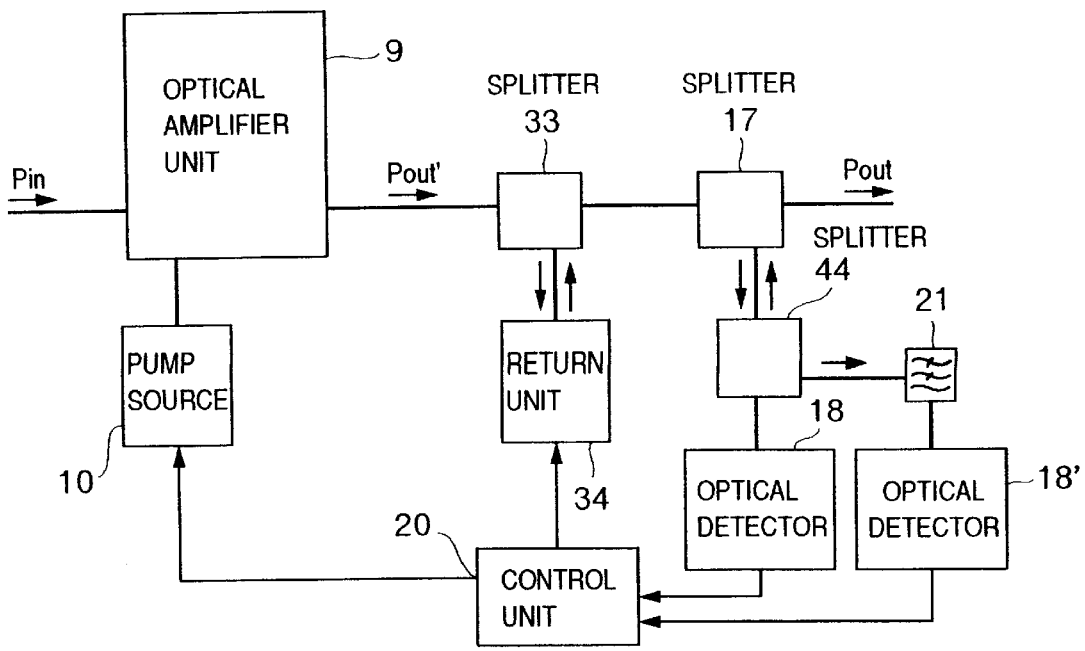
FIG. 27 shows a specified composition of another example of the optical amplifier system of FIG. 14.

FIG. 27 shows a specified composition of the optical amplifier system of FIG. 14. As shown in FIG. 27, generally, external optical signal Pin inputted to the amplifier unit 9 is amplified by the amplifier unit in the state where the amplifier unit 9 is pumped with the pumping light from the pump source 10, and the amplified signal is outputted as an optical output Pout' which mainly includes the optical signal. In the present invention, a splitter 33 for return light generation, and a splitter 17 used for detection of the optical power of the optical output Pout' are provided on the route for the optical output Pout'. A part of the optical output Pout' which has passed the splitter 33 is separated by the splitter 17, and then further by the splitter 44. The part of the optical output separated by the splitter 44 is then split into a first output portion with which the optical detector 18 detects the optical power of the optical output Pout which mainly includes the optical signal, and a second output portion which is then applied to an optical filter 21 which allows for only optical components other than the optical signal to pass. The output from the filter is then used for an optical detector 18' to detect the optical power of the optical components other than those of the optical signal. An optical signal which has passed the optical splitter 17 is an optical output Pout which mainly includes the optical signal from the optical amplifier unit 9. A part of the optical output Pout' which mainly includes the optical signal from the optical amplifier unit 9 is separated by the splitter 33, its optical power is adjusted the in return unit 34, and the resulting signal then returns as return light to the optical amplifier unit 9 again through the splitter 33. The control unit 20 controls at least one of the pump source 10 and return unit 34 based on the detected optical power from the optical detector 18 so that the optical power of the optical output Pout which mainly includes the optical signal is maintained at a desire value. The effect of this invention is not lost even by omitting the optical detector 18 which monitors a part of the optical output Pout.

Figure 28:
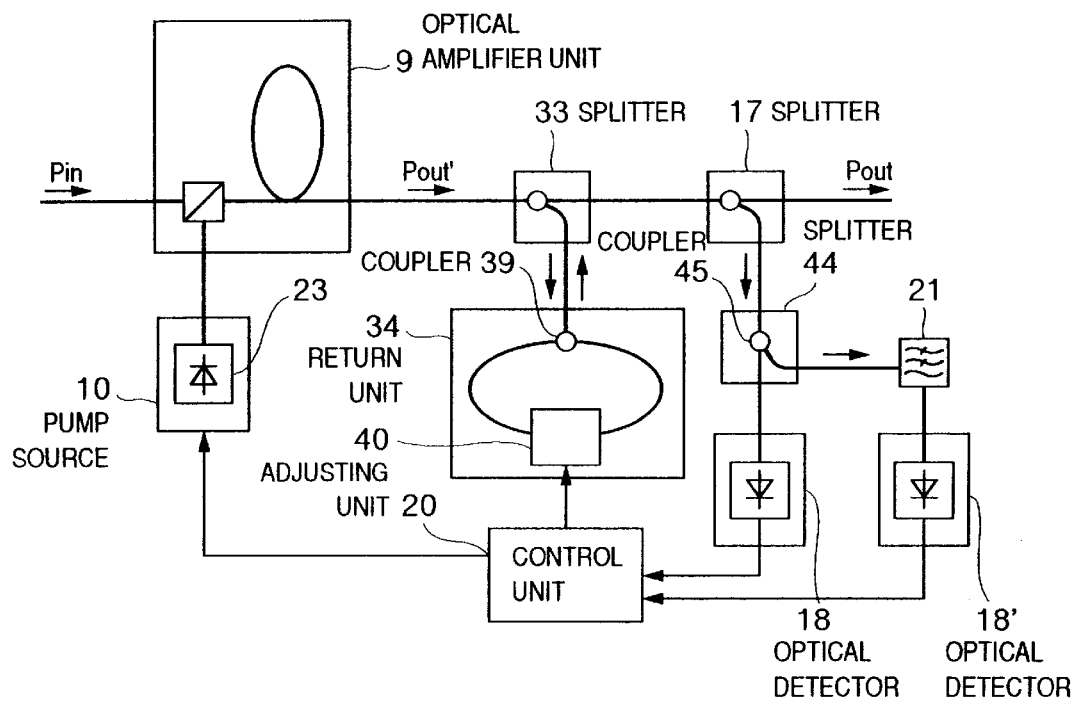
FIG. 28 shows a specified composition of another example o f the optical amplifier system of FIG. 27.

FIG. 28 shows a specified composition of one example of the optical amplifier system shown in FIG. 27. As shown, a part of the optical signal separated by the optical splitter 17 is further split by an optical coupler (50:50) 45 as an optical splitter 44 into two output portions. One of the two output portions is detected by the optical detector 18, and the other portion is passed through the optical filter 21 which allows only light components other than the optical signal to pass, and then detected by the optical detector 18'. For instance, elements of light other than the optical signal are in a range of wavelengths of 1520–1545 nm when the wavelength of the optical signal is 1550 nm. Therefore, the use of a low pass filter is required which filters out light having wavelength of no less than 1545 nm.

Figure 29:
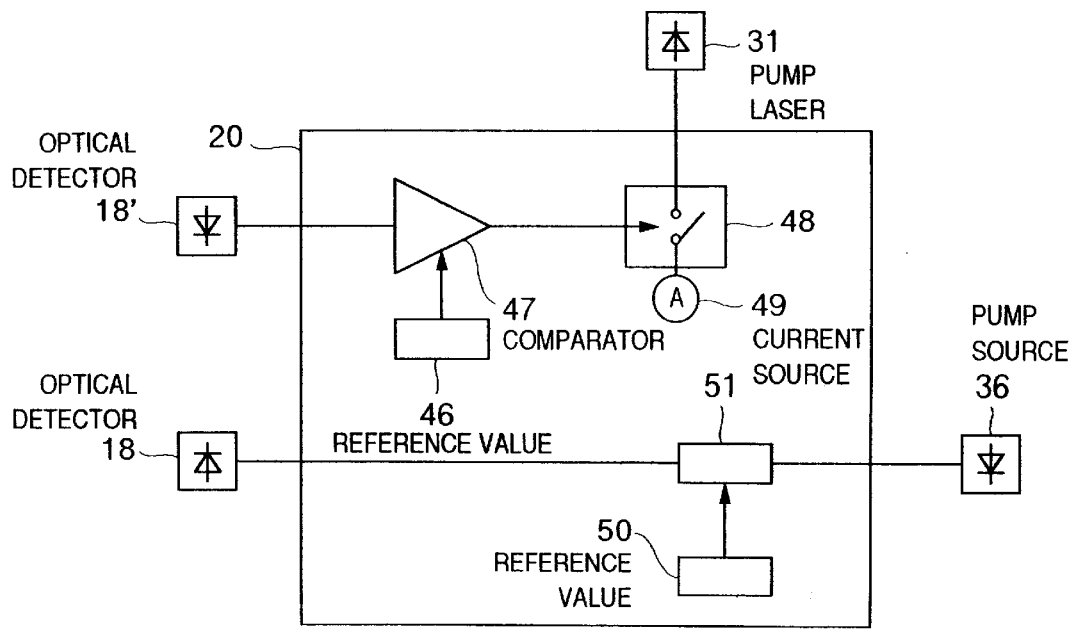
FIG. 29 shows a specified circuit composition of one example of a control unit shown in FIGS. 24, 25, and 26.

FIG. 29 shows a concrete composition of the control unit 20 in FIGS. 24, 25 and 26. The detected light power from the detector 18' is compared with a predetermined reference value 46 in a comparator 47. When the detected power is larger than the predetermined reference value, the switch 48 is turned on and a current is supplied from a current source 49 to the 980 nm pump source 31 of the adjusting unit 40 so as to operate the pump source 31. A feedback circuit 51 drives the 980 nm pump source 36 so that the monitored signal from the detector 18 becomes constant in comparison with the predetermined reference value 50.

As mentioned above, the return light has a function opposite to the pumping light, and an excessive amount of the return light limits the original performance of the optical amplifier.

It is important to prevent a light surge from occurring that the accumulated energy in the erbium doped optical fiber does not increase beyond a fixed value. Optical wavelength elements other than the optical signal are included in the optical signal amplified by the optical amplifier unit 9. The wavelength elements other than the optical signal show the amount of the accumulated energy.

For instance, in this composition, the optical signal gain of the optical amplifier unit is assumed to be 32 dB, and a light surge is suppressed at a value of not more than 1 dB of a normal optical output strength. To this end, the spontaneous emission light amount of the optical wavelength elements other than the optical signal is controlled so as not to increase beyond −14.0 dBm/nm.

By adopting the composition explained in the specified example, the return light is caused to act only when the accumulated energy increases beyond a predetermined value, whereas the action of the pump source is not limited in a predetermined normal range of accumulated energy.

Control may be provided such that when the accumulated energy increases beyond the predetermined power, the return light acts and the pumping light decreases. In that case, though the accumulated energy cannot be consumed by decreasing the pumping light merely, a light surge is suppressed more effectively because the return light acts at the same time.

The light having wavelength elements other than the optical signal which indicates the amount of the accumulated energy is emitted not only from the back of the erbium doped optical fiber but also from the front and side of the fiber. Therefore, the optical detecting units may detect the light by getting it from the front and back of the fiber. According to this composition, optical control means having a strength enough to suppress a light surge, and a good control response is easily provided.

Figure 30:
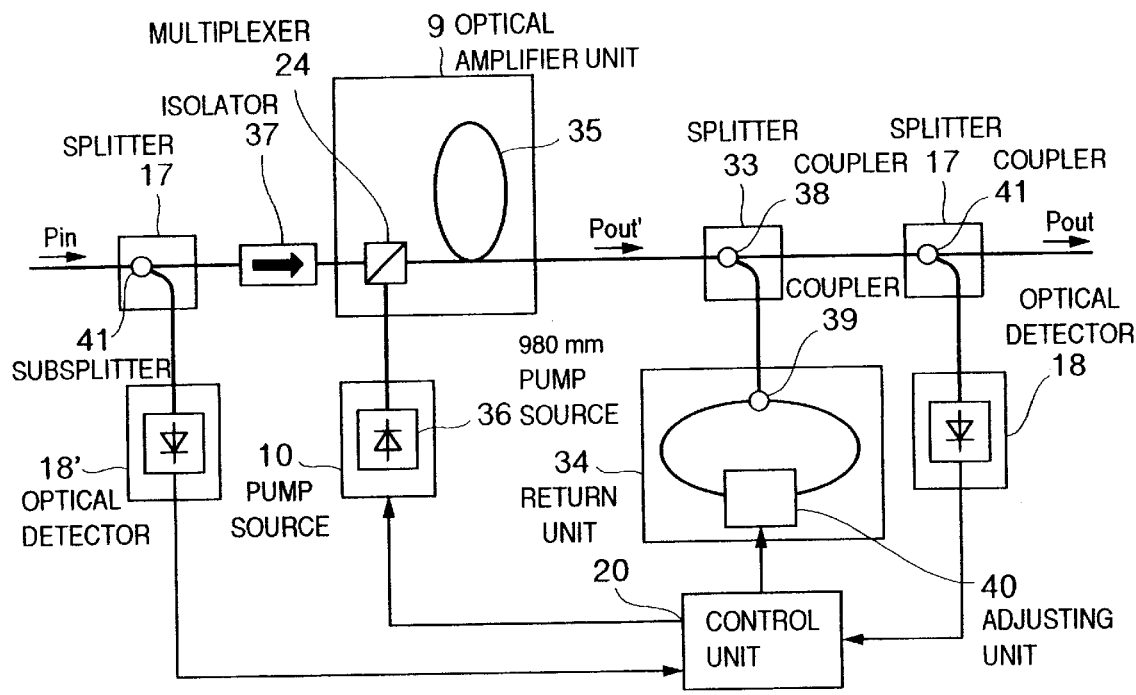
FIG. 30 shows a specified composition of another example of the optical amplifier system of FIG. 14.

FIG. 30 shows a modification of the optical amplifier system of FIG. 14. The modification includes the return unit of FIG. 20. Suppression of a light surge will be illustrated below, using in the optical transmission system of FIG. 4 a system which includes a combination of the receiver of FIG. 12 and the optical amplifier system of FIG. 30.

In this composition, about 3% of the optical output from the control light introducing (97:3) splitter 38 is introduced into the return unit 34. In the (50:50) optical splitter 39 of the return unit 34, about 50% of the output of the splitter 39 is adjusted through a clockwise route by the adjusting unit 40 to become a predetermined optical power, 50% of which is then supplied to the splitter 38. Similarly, about 50% of the light which is supplied through a counterclock route to the adjusting unit 40 is returned from the adjusting unit 40. As a result, almost all of the light from one end of the adjusting unit 40 is returned as return light. About 3% of the returning light is introduced by the splitter 38 into the optical amplifier unit 9. As the power of the return light is higher, the effect of its suppression is larger. However, when the splitting ratio of the splitter 38 is larger, the optical output of the optical amplifier unit 9 is lower, and the original characteristic of the optical amplifier system is deteriorated. For instance, 50% of the return light can be returned by adjusting the splitting ratio of the (97:3) splitter 38 to 50%. However, the optical output loss of the optical amplifier system decreases also to 50%.

If light of satisfactory power is prepared by the return light adjusting unit 40 like this composition, an optical loss in the splitter 38 is suppressed to −3 %. Even if 97% of the return light is lost, a satisfactory effect of suppression is produced. There is a method of using optical circulators to suppress the loss of an optical output from the optical amplifier unit 9 and to suppress the loss of the optical power of the return light to a minimum. However, the use of the optical couplers is advisable because the composition of that method is more complex and more expensive than the optical couplers.

A similar thing can be said also when the control light is introduced into the front of the optical amplifier unit 9. Especially, when a signal optical loss is caused before the optical amplifier unit 9, the noise figure characteristic of the entire optical amplifier system is deteriorated. Therefore, the return unit of this invention is excellent in that it has a satisfactory effect of surge suppression without adversely affecting the characteristic of the entire optical amplifier system.

The optical amplification unit 29 of the adjusting unit 40 which has the same composition as the optical amplification unit 35. The adjusting unit 40 also uses a pump source of light of 0.98 $\mu$m to pump the optical amplifier unit 35 with pumping light of 0.98 $\mu$m. The reason for this is that, as described above, the object of the present invention is to consume the energy of an atom at an excitation level effectively. In order to consume the accumulated energy of the optical amplifier unit 35 efficiently, the amplification band width of the optical amplifier unit 29 used in the adjusting unit 40 should be similar to that of the optical amplifier unit 35. As mentioned above, the object of the present invention is to consume an accumulated energy at an excitation level. For instance, when the optical amplifier unit 35 is pumped with a 0.98 $\mu$m pump source 36, a level which emits light having a wavelength in a 2.75 $\mu$m band is present above the level which involves the induced emission of the optical signal. Therefore, the effect of the return light is further improved by using the pump source 31 and optical amplifier unit 29 which have the same emitting process in the adjusting unit 40.

As will also be described later, the optical power of the pump source 31 used and the amount of the current consumed are reduced. Therefore, no temperature adjusting function of the pump source 31 is provided, and the composition of the pump source 31 is simplified.

Figure 31:
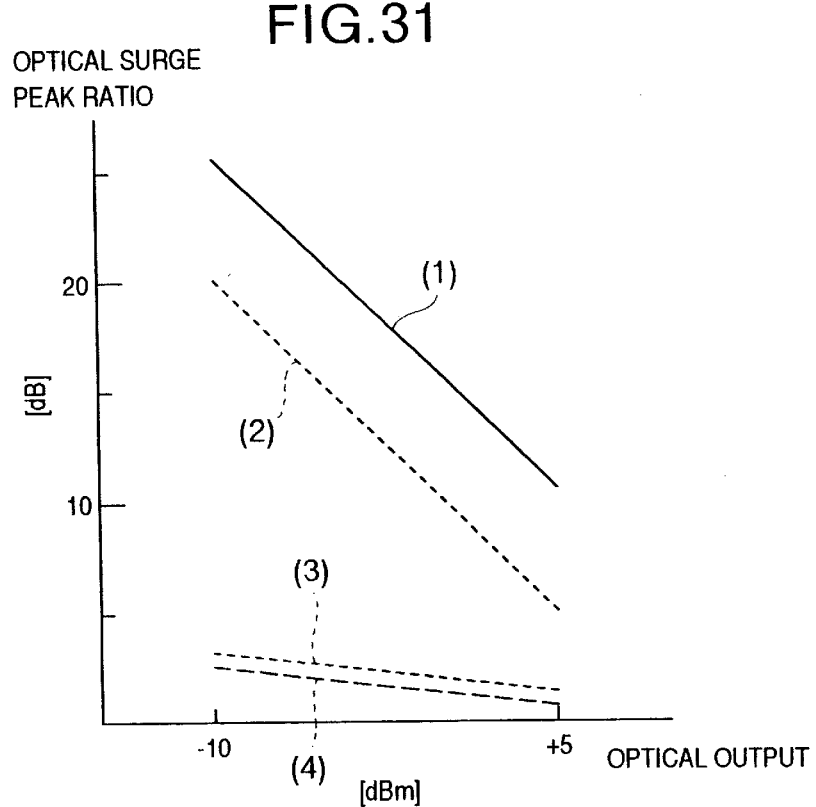
FIG. 31 shows the relationship between optical output and light surge peak ratio.

According to the optical transmission system of FIG. 5, the strength of the light surge peak is suppressed to +16 dBm or less to prevent an optical receiver unit of the receiver 8 from being destroyed. Preferably, the strength of the light surge peak is suppressed to +10 dBm or less. In addition, the optical output power of the last optical amplifier system is from −10 to +5 dBm. FIG. 31 shows the peak ratio of a light surge which the particular composition can suppress with the optical output power. In (1) of FIG. 31, the characteristic of this transmission system is to suppress the peak ratio of the light surge, for example, to 26 dB or less when the optical output is −110 dBm. For example, when the optical output is +5 dBm, the peak ratio of light surge is suppressed to 11 dB or less. More preferably, as shown in (2) of FIG. 31, the peak ratio of the light surge is suppressed to 20 dB or less, for example, when the optical output is −10 dBm. For example, when the optical output is +5 dB, the peak ratio of the light surge is suppressed to 5 dB or less.

The conditions of a light surge appearing most remarkably are that a steep optical pulse rises before the front optical amplifier system. This is because light surges are generated in and totaled by the respective optical amplifier systems. As explained in FIG. 5, if the control source used in the present invention is provided in each of the optical amplifier systems and the suppression degree or the light surge ratio is dispersed in a constant value to each of the optical amplifier systems, the suppression degree of the light surge or the light surge ratio is suppressed to within a lower constant value on the route of the optical transmission system. The risk of the optical transmission system is moderately distributed at the same time. Therefore, as shown in (3) of FIG. 31, when four optical amplifier systems are used on the route of the transmission system, the features of the individual optical amplifier systems are that when the optical output of the last optical amplifier system is −10 dBm, the peak ratio of the light surge is suppressed to 6.5 dB or less. Similarly, when the optical output is, for example, +5 dBm, the peak ratio of the light surge is suppressed to 2.75 dB or less. More preferably, as shown in (4) of FIG. 3, when the optical output is 10 dBm, the peak ratio of the light surge is suppressed to 5 dB or less. For example, when the optical output is +5 dBm, the peak ratio of the surge is suppressed to 1.25 dB or less.

To prevent the destruction of an optical receiver unit in the optical receiver as one example in the actual system design, the peak ratio of the light surge was suppressed to +10 dBm or less. In addition, since the optical output power of the last optical amplifier system is −2 dBm in this system, it is necessary to design the ratio of the light surge in the last optical amplifier system so as not to exceed 12 dB. Since the four optical amplifier systems are used on the route of the transmission system, the ratio of the light surge to the normal optical output is designed so as to be suppressed to a value smaller than 3 dB.

An immediate cause for the optical receiver to be destroyed with a light surge often originates in joule heat. Because the output pulse as the light surge is a relatively long-time lasting pulse, it is necessary to settle that surge pulse as fast as possible.

Figure 32:
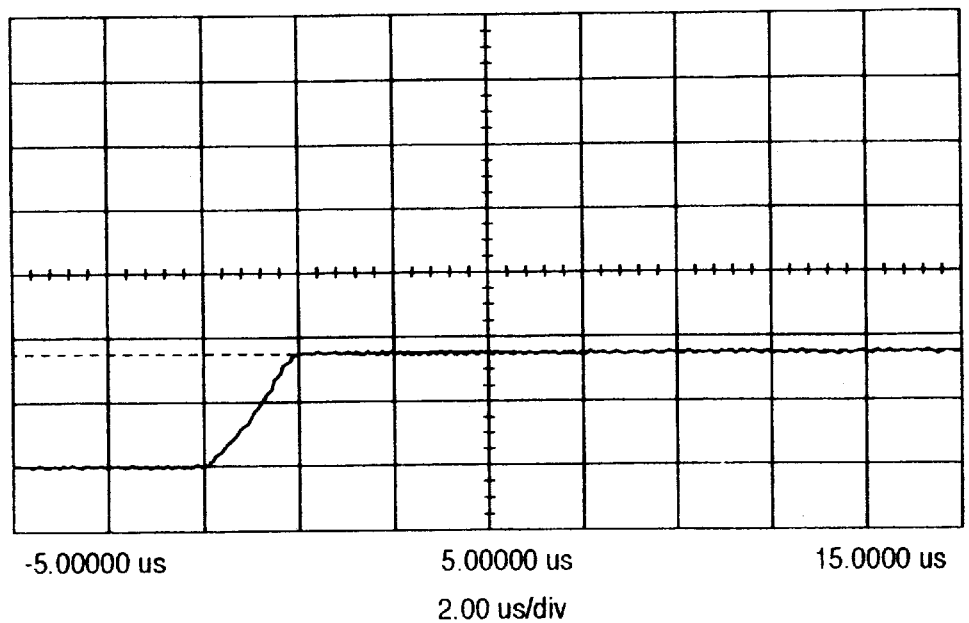
FIG. 32 shows an input optical pulse which generates a pseudopulse for a light surge used in the specified example of FIG. 30.

FIG. 32 shows an optical pulse which generates a false light surge in this specified example. Light whose optical power rose from minus infinity to +3 dBm, and whose maximum risetime was 2 $\mu$s was input to the optical amplifier system.

Figure 33:
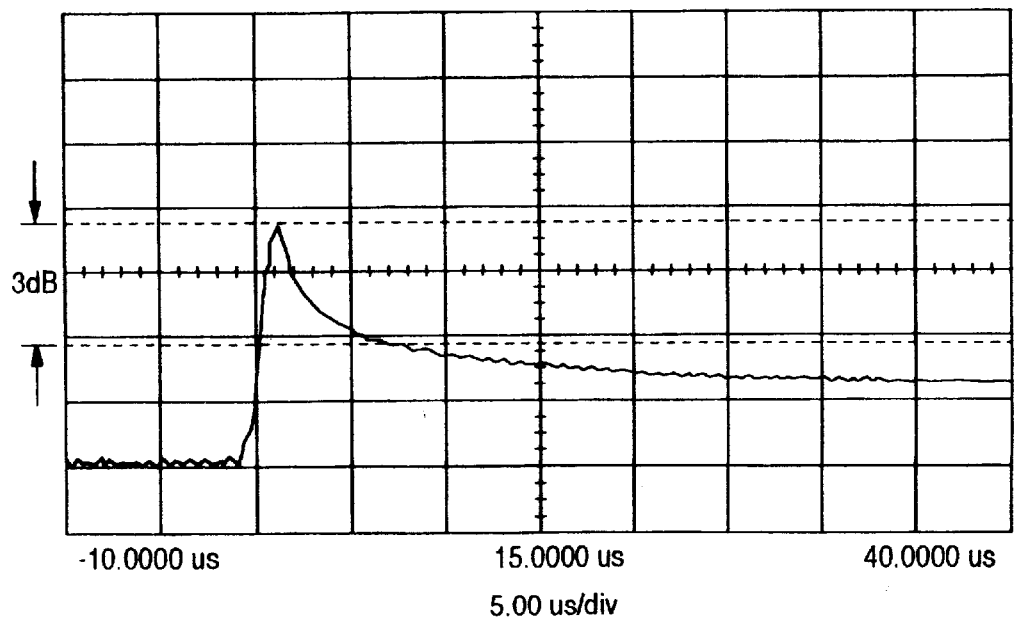
FIG. 33 shows an optical output of the specified example of FIG. 30.
Figure 34:
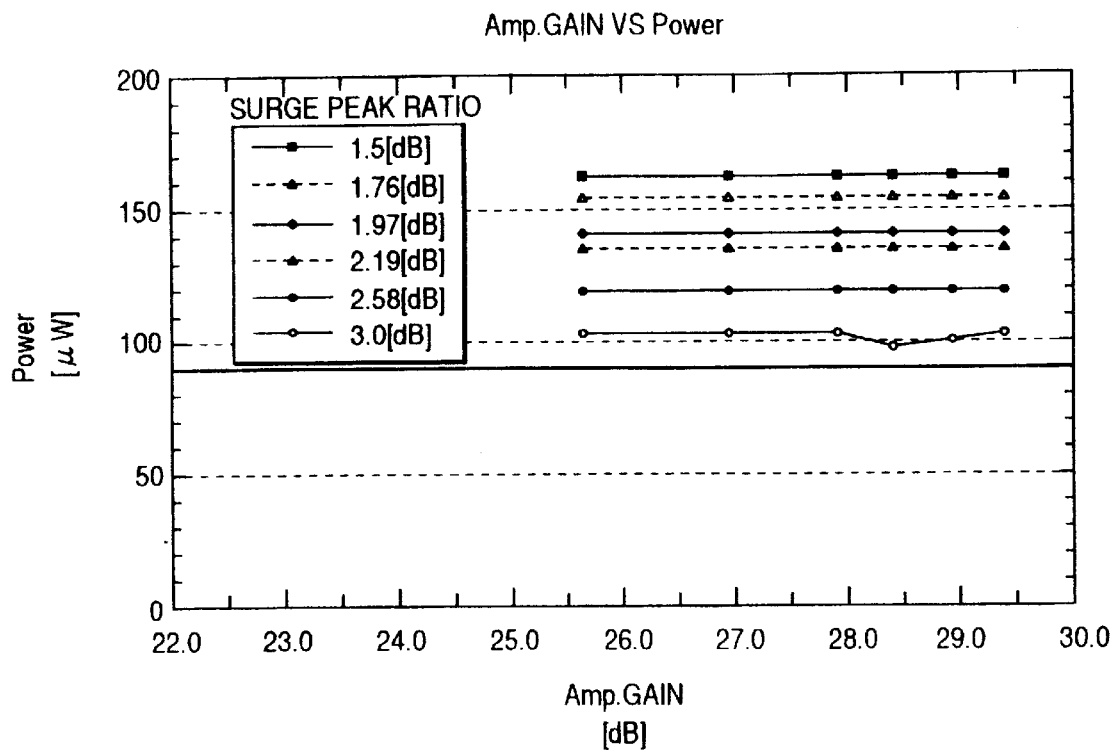
FIG. 34 shows return light power inputted to the optical amplifier unit to the gain amplification factor of the optical amplifier unit in the specified example in FIG. 30.

FIG. 33 shows a result of suppression of the peak ratio of a light surge to a smaller value than 3 dB by this composition. FIG. 34 shows the return light power inputted to the optical amplifier unit to the amplification factor of the gain of the optical amplifier unit at this time. Return light of at least 100 $\mu$W is required to be inputted to the optical amplifier system to suppress the light surge to within a designed value. At this time, optical power of the return light of at least 3.3 mW is supplied to the front of the (3:97) optical coupler 38.

Figure 35:
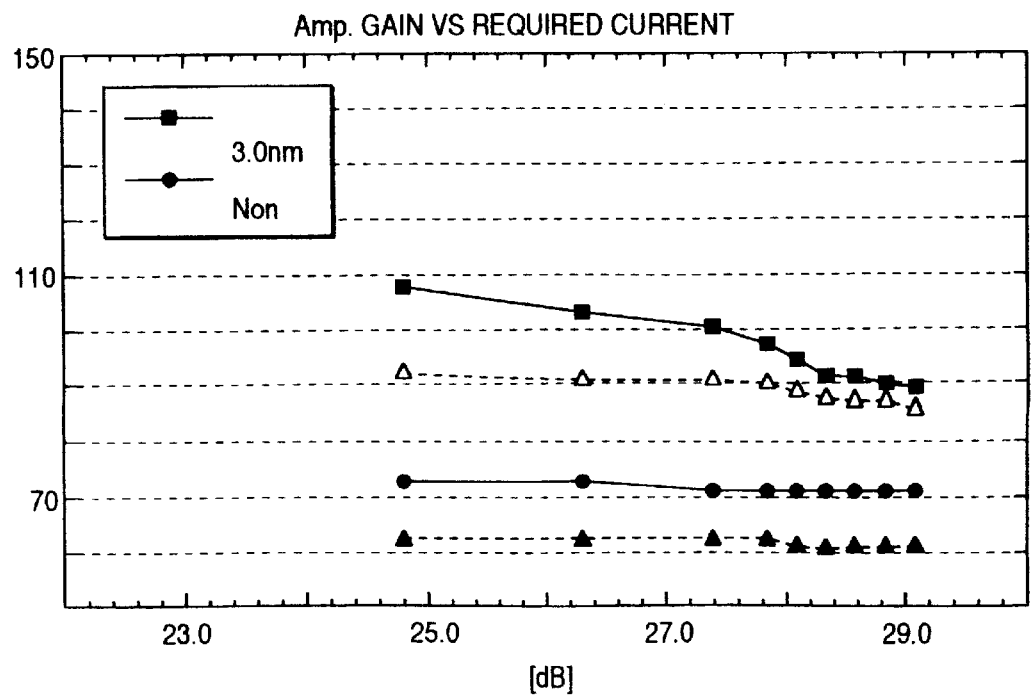
FIG. 35 shows a current required by the pump source when the wavelength band width to the return light is changed in the specified example of FIG. 30.

It is important to improve the effect of the return light as the control light that the wavelength band of the return light has a wavelength band other than that of the optical signal. FIG. 35 shows a required current flowing through the pump source of light when the width of the wavelength band of the return light is changed. According to the inventive composition, the required current increases by reducing the wavelength band while the light surge is effectively suppressed by a small current. Especially, when the amplification gain of the optical amplifier unit is suppressed to a comparatively low value, the difference between the required currents is remarkable. In a 0.3 nm or less −3 dB wavelength band, the required current increases by decreasing the gain of the optical amplifier unit.

A result of an experiment shows that the wavelength band of the return light is preferably light which has a wavelength band of 0.1 nm or more in a 3 dB wavelength band. Even light having a wavelength band of 0.1 nm or less is effective so long as it has a plurality of wavelengths. For instance, when a plurality of optical signals are amplified at the same time by the optical amplifier unit as in the wavelength multiplexing system, the use of the plurality of optical signals for the return light is effective. Alternatively, it is also effective to use as the return light an optical signal having a 40 dB or less skirt of an S/N ratio mountain or light of a wavelength having a side mode of 40 dB or less not suitable for the optical signal, other than an optical signal having a side mode suppression ratio of approximately 30–40 dB generally used.

The optical amplifier unit often changes in device length, composition concentration or shape depending on the usage thereof. For instance, in general rare earth element doped optical fibers, the amplification efficiency and the noise figure are generally in the relationship of a trade-off. In order to decrease the noise figure, the amount of a rare earth element to be doped into an optical fiber is reduced, or the length of an optical fiber into which a rare earth element is doped is reduced. As a result, however, the amplification efficiency decreases.

Figure 36:
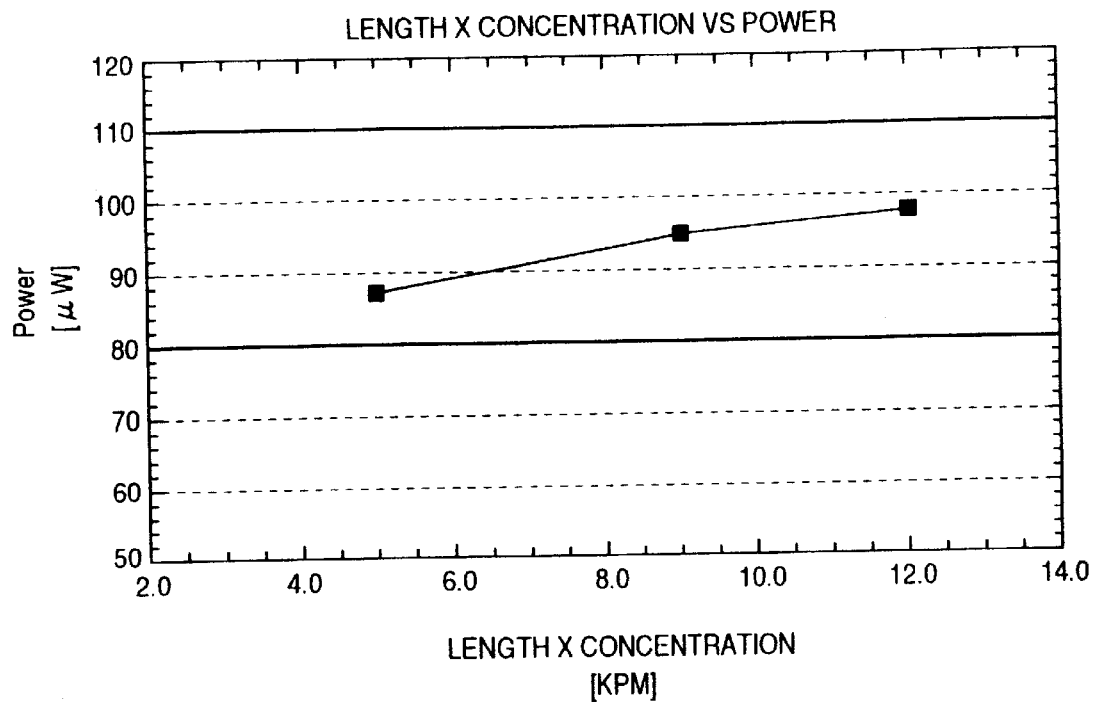
FIG. 36 shows a change in the return light power when the amplification parameter of the optical amplifier unit changes in the specified example of FIG. 30.

FIG. 36 shows a change in the return light power occurring when the amplification parameter of the optical amplifier unit changes. As a result, the gain amplification factor of the optical amplifier unit is often decided in a real system design. Experiment using this composition also shows the required gain of the optical amplifier system being 28 dB, and return light power needed when the length or concentration of a rare earth doped optical fiber changes depending on usage. When the length or concentration of the optical fiber is changed, the required power of the pump source increases whereas the noise figure decreases.

When the gain of the optical amplifier system is fixed at 28 dB according to FIG. 36, the adjusting unit is required to be composed such that the return light power is adjustable in a range of about 80–110 μW.

When the required gain changes depending on the usage of the optical amplifier system, the range of adjustment of the return light power may be determined as in the present method.

It is preferable to introduce all light in a wavelength band as the return light from the adjusting unit into the amplifier system without restricting light wavelengths with an optical filter, etc., as in this composition. However, when the return light is introduced into a front of the optical amplifier unit, and especially when an optical filter is required to be inserted, it is necessary to set the wavelength band of the return light in a preferable wavelength band.

Figure 37:
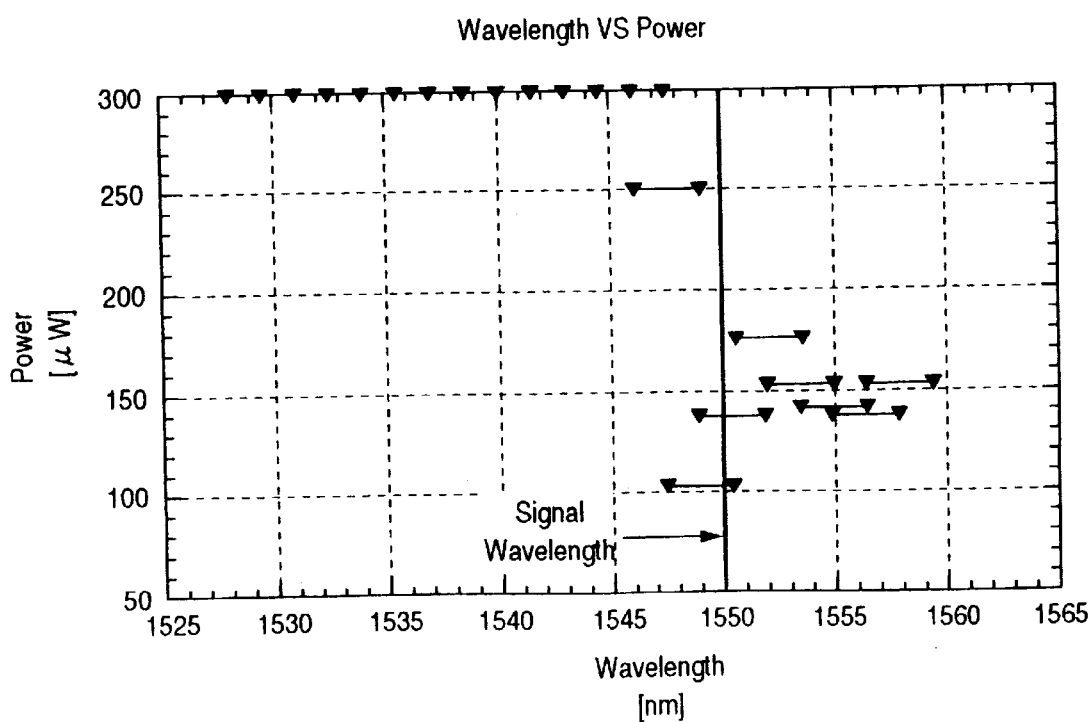
FIG. 37 shows return light power required for a wavelength band of the return light set at 3 nm in the specified example of FIG. 30.

FIG. 37 shows return light power needed for a wavelength band of return light set in 3 nm. The wavelength of the optical signal was assumed to be 1550 nm.

The return light is obtained by adjusting a part of the optical output. What occupies the maximum power of the optical output is an optical signal wavelength. Therefore, light having the signal light wavelength and other wavelengths is most effective.

Light having the signal light wavelength and other wavelengths is most effective also for the following reason. When a light surge is generated, for instance, in the optical amplifier unit if the optical signal has a band which has the wavelength of the optical signal, a new light surge is generated with this light surge pulse in the optical amplifier unit of the adjusting unit. As the light surge is steeper and higher in level, the light surge in the adjusting unit becomes larger. Therefore, return light of power which is higher than the power of light as the normal return light is returned the moment a light surge is generated in the optical amplifier unit. Therefore, this synergistic effect more effectively suppresses the light surge in the optical amplifier unit. The effect of the surge suppression becomes larger as the generated surge is larger.

Figure 38A:
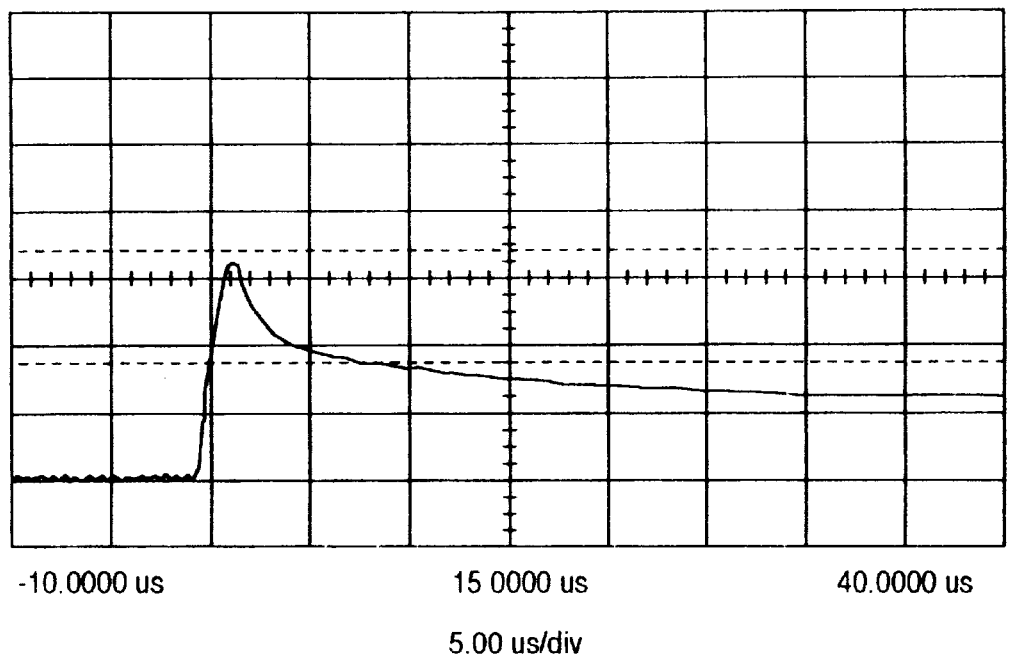
FIGS. 38A and 38B light surge outputs suppressed by return light containing an optical signal and that not containing the optical signal, respectively, in the specified example of FIG. 30.
Figure 38B:
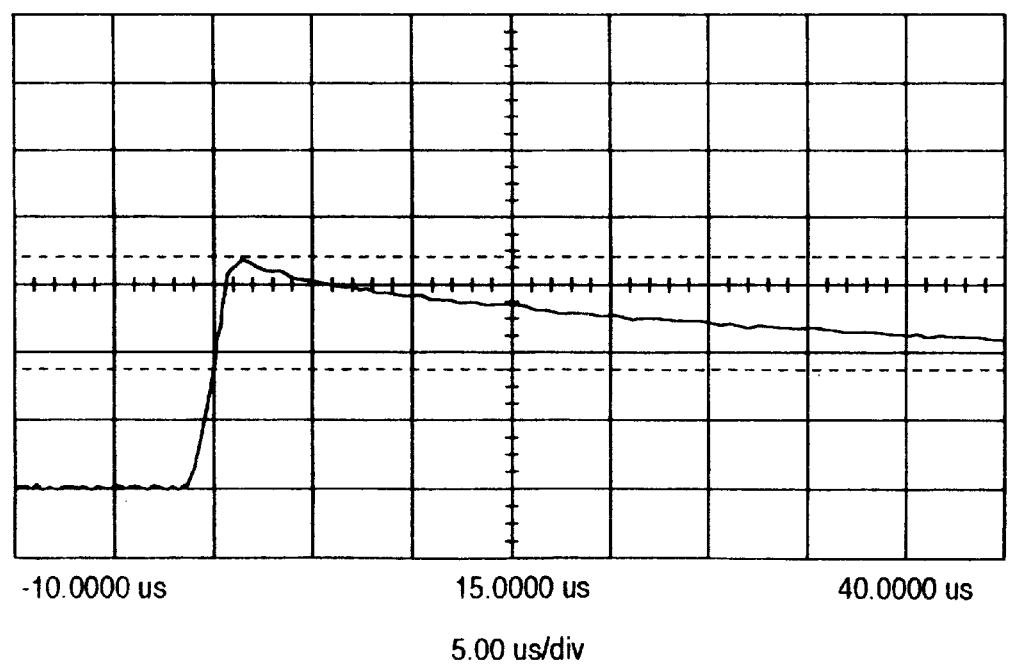

FIGS. 38A and 38B show corresponding surge pulses suppressed to 3 dB or less when return light which has a band of 3 nm which contains an optical signal is used and when return light which does not contain the signal light is used. As will be obvious from FIGS. 38A and 38B, the return light having the wavelength of the optical signal suppresses the generated surge more greatly than the return light having no wavelength of the optical signal, and the time required for the surge to settle to the normal one in the former case (FIG. 38A) is reduced compared to that in the latter case (FIG. 38B). Therefore, the amount of generation of joule heat which will be an immediate cause of destruction of the optical receiver is reduced. In order to reduce the settling time, it is effective to introduce slight return light even when the normal optical signal is input. This is because the energy accumulated in the adjusting unit is maintained, and a light surge is more easily generated in the adjusting unit. A decrease in the gain amplification factor of the optical amplifier unit due to introduction of the slight return light is sufficiently compensated by increasing the amount of pumping light from the pump source to some extent.

Figure 39:
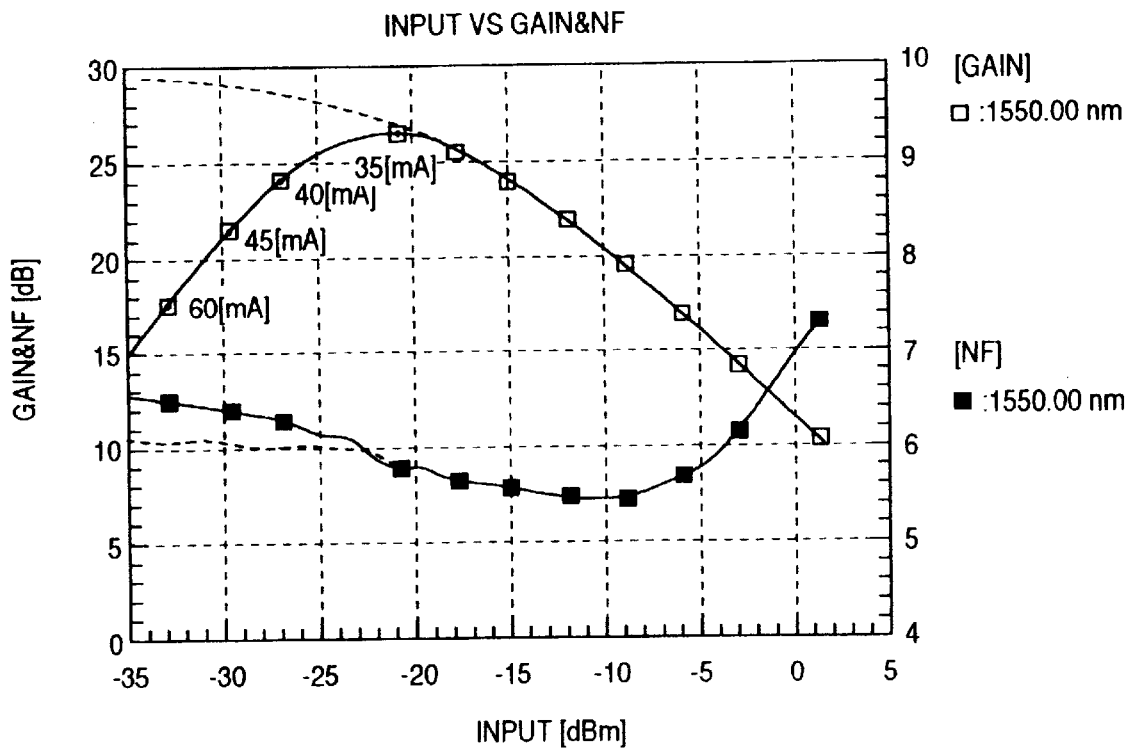
FIG. 39 shows a gain characteristic of the optical amplifier system where the light surge is suppressed to 3 dB or less in the specified example of FIG. 30.

FIG. 39 shows the gain characteristic of the entire optical amplifier unit by which the light surge is suppressed to 3 dB or less. A normal range of optical signal input strength is −20 dBm or more and an input light strength of about 15 dB (about −35 dBm) is used as a system margin. More specifically, the return light is controlled such that the gain characteristic is decreased continuously to a small extent and a deterioration in the noise figure is suppressed to the utmost so as not to stop the optical amplification abruptly to thereby hinder the signal transmission even if the input signal becomes −20 dB or less.

For example, the current flowing through the pump source is about 35 mA at an input strength of −21 dBm. The current flowing through the pump source is about 40 mA at an input strength of −27 dBm. The current flowing through the pump source is about 45 mA at an input strength of −29.5 dBm. The current flowing through the pump source is about 60 mA at an input strength of −33 dBm.

At this time, the spontaneous emission light amount is −16.18 dBm/nm at an input strength of −21 dBm; −17.97 dBm/nm at an input strength of −27 dBm; 21.36 dBm/nm at an input strength of −29.5 dBm; and −23.70 dBm at an input strength of −33 dBm. Since the spontaneous emission amount is −16.09 dBm/nm at an input strength of −20 dBm, it is suppressed to about −16 dBm/nm or less in this composition.

The gain decreases, for instance, only by about 2 dB than the maximum gain at −20 dBm even at an input optical signal strength of −26 dBm. The gain is controlled so that a deterioration is hardly seen in the vicinity of the range of input strength of the normal optical signal. Because a deterioration in the noise figure is about 0.2 dB, this transmission system does not receive any adverse effects.

In the prior art optical amplifier system, it is necessary to detect the instantaneous interception of and/or decrease in an optical input instantaneously, and to decrease the output or gain of the amplifier system to prevent the occurrence of a light surge therein. However, this will cause a deterioration in a characteristic of noise resistance, etc., for determination of the range of the normal input strength, and cause control over the stabilization, etc., of the optical output to get out of order. According to this invention, an abnormal decrease in the signal input is accurately detected, and the optical amplifier system is operated in a stabilized manner because the problem of these light surges is solved.

Figure 40:
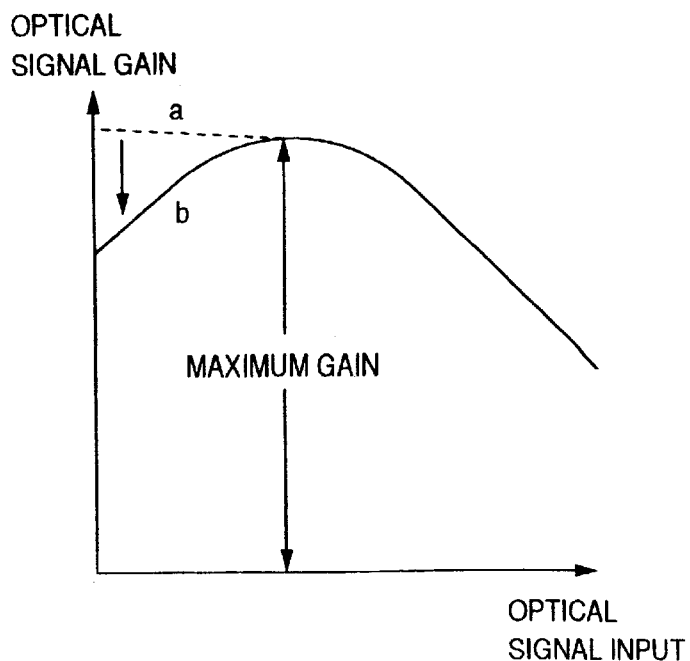
FIG. 40 shows the relationship between output characteristic of the whole optical amplifier system and instantaneous interception time of an optical signal input.
Figure 41A:
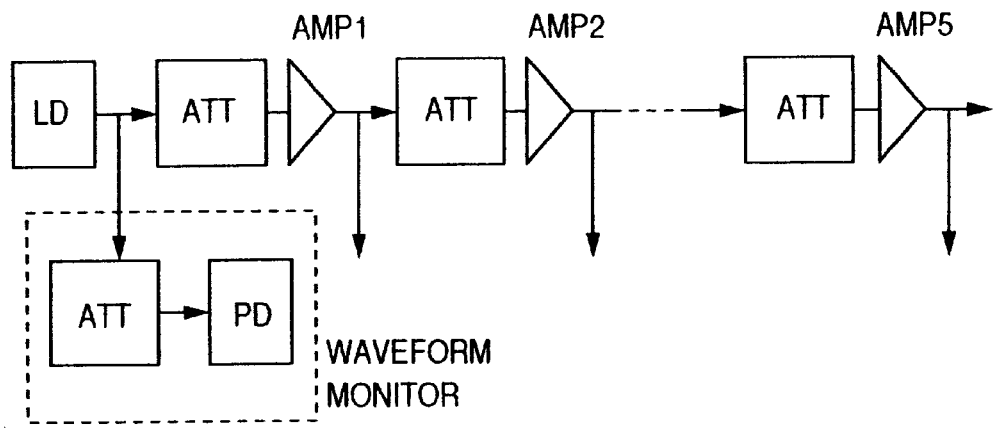
FIGS. 41A and 41B show the composition of a conventional optical amplifier.
Figure 41B:
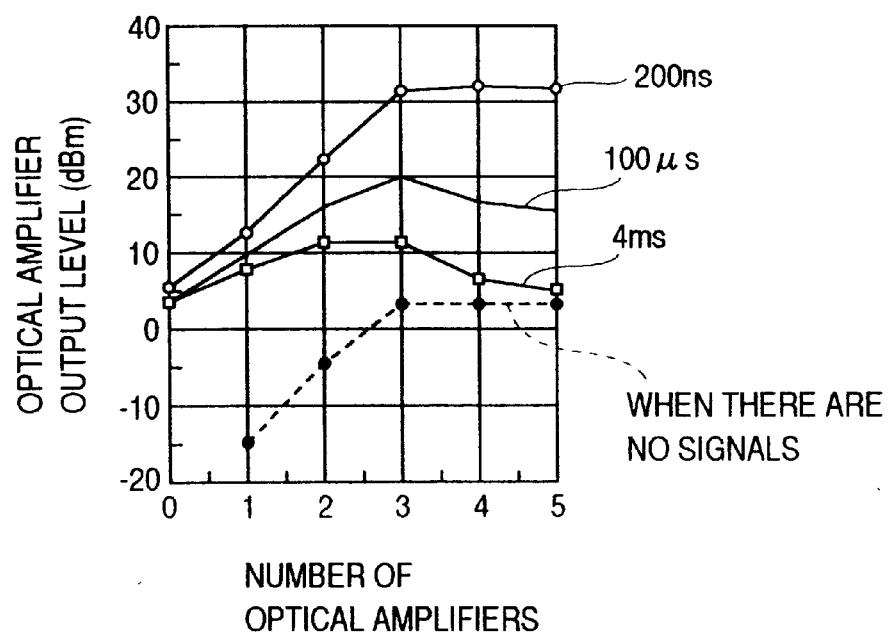
Figure 42:
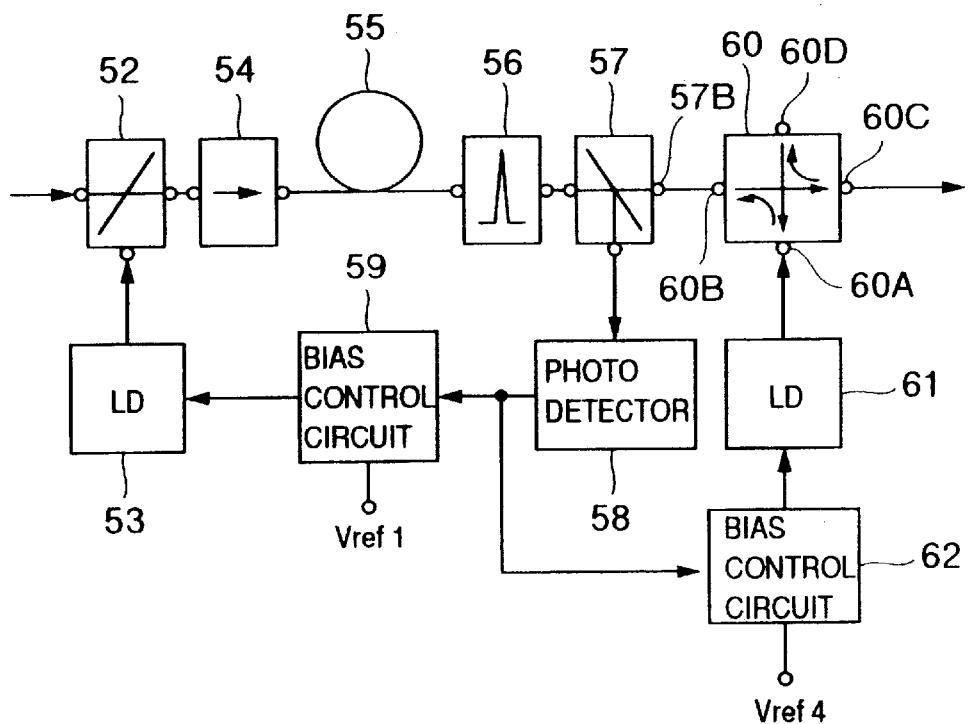
FIG. 42 shows the composition of another conventional optical amplifier.
Figure 43:
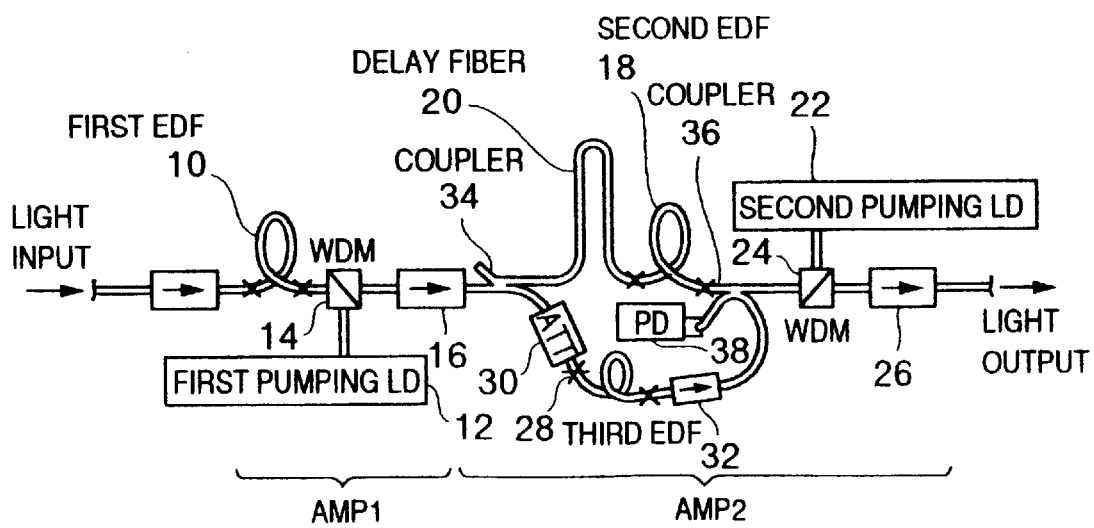
FIG. 43 shows the composition of still another conventional optical amplifier.

FIG. 40 shows the output characteristic of the entire optical amplifier system is shown in correspondence to the instantaneous interception time of the input. The response speed of the rare earth element doped optical fiber does not overtake a changing input when the instantaneous interception time is 10 $\mu$s or less, no light surge is generated. Therefore, the signal gain controls the adjusting unit so as to draw a curve a of FIG. 40 for an input having 10 $\mu$s or less. On the other hand, the signal gain controls the adjusting unit so as to draw a curve b of FIG. 40 for an input having an instantaneous interception time of 10 $\mu$s or more. That is, with an instantaneous interception which does not influence the signal characteristic, the gain of the optical amplifier system is maintained.

In order to prevent the occurrence of a light surge in the prior art optical amplifier system, it is necessary to instantaneously detect instantaneous interception of, or a decrease in, the optical input to thereby decrease the output or gain of the amplifier system. However, this would deteriorate a characteristic of noise resistance, etc., of the amplifier system for determination of the strength range of a normal input signal and/or cause control over stabilization of the optical output to get out of order. According to this invention, an abnormal decrease in the signal input is accurately detected, and the optical amplifier system is operated in a stabilized manner because the problem of those light surges is solved.

As described above, according to the present invention, an optical amplifier unit control method and optical amplifier system which is capable of suppressing a surge and has high reliability and safety, and an optical transmission network using the unit and system are provided.

What is claimed is:

1. A method of controlling an optical amplifier unit which is supplied with energy by pumping light and amplifies an optical signal with the supplied energy, comprising the steps of:

detecting the strength of the optical signal inputted into the optical amplifier unit;

inputting surge control light having a wide wavelength band including an output light of the optical amplifier unit to the optical amplifier unit; and controlling the amplifier unit so as to have a maximum gain at a predetermined value of the strength of the input optical signal and a positive gain area for a strength of the input optical signal not more than the predetermined value of the strength of the input optical signal.

2. An optical amplifier system including an optical amplifier unit and a pump source for pumping the amplifier unit, comprising:

an optical detector which detects the strength of light inputted to the optical amplifier system;

a control unit which receives a detection signal representing the strength of the inputted light and recognizes that the strength of the inputted light is not more than the predetermined value;

an optical controller which receives a control signal from said control unit and introduces into the optical amplifier unit surge control light having a wide wavelength band including an output light of the optical amplifier unit which controls a light surge occurring in the optical amplifier unit, whereby a noise figure of the optical amplifier system is suppressed at a value not more than 10 dB.

3. An optical amplifier system including an optical amplifier unit and a pump source for pumping the amplifier unit, comprising:

an optical detector which detects the strength of light inputted to the optical amplifier system;

a control unit which receives from said optical detector a detection signal representing the strength of the inputted light and recognizes that the strength of the inputted light is not more than the predetermined value for at least 10 $\mu$s;

an optical controller which receives a control signal from said control unit and introduces into the optical amplifier unit surge control light having a wide wavelength band including an output light of the optical amplifier unit which controls a light surge occurring in the optical amplifier unit.

4. An optical amplifier system including an optical amplifier unit for receiving an optical signal and a pump source for pumping the amplifier unit, the amplifier system having a maximum gain of not less than 28 dB for the optical signal, comprising:

an optical controller which introduces surge control light having a strength of not less than 80 $\mu$W and a wide wavelength band including an output light of the optical amplifier unit into the optical amplifier unit.

5. The optical amplifier system according to claim 4, wherein the optical controller comprises means for suppressing a noise figure of the optical amplifier system at a value of not more than 10 dB.

6. An optical amplifier system having an optical amplifier unit which is supplied with energy by pumping light and amplifies light with the supplied energy, comprising:

gain control means for controlling the gain of the amplifier system depending on the strength of an optical signal inputted to the amplifier system and for inputting surge control light having a wide wavelength band including an output light of the optical amplifier unit to the optical amplifier unit such that the amplifier unit has a maximum gain at a predetermined value of the strength of an optical signal inputted to the optical amplifier system and an area of a positive gain of not more than the maximum gain for a strength of the optical signal of not more than a predetermined value.

7. An optical transmission system comprising:

an optical transmitter system for transmitting an optical signal;

an optical amplifier system having a maximum gain of at least 28 dB for receiving the optical signal from said optical transmitter system and for amplifying and outputting the optical signal; and a receiver for receiving the outputted signal from said amplifier system;

said amplifier system comprising an optical amplifier unit for receiving the optical signal from said transmitter system, a pump source for pumping said amplifier unit, and an optical controller for introducing control light having a strength of at least 80 $\mu$w and a wide wavelength band including an output light of the optical amplifier unit into said optical amplifier unit.

8. A method according to claim 1, wherein the surge control light having the wide wavelength band includes spontaneous emission light of the optical amplifier unit.

9. An optical amplifier system according to claim 2, wherein the surge control light having the wide wavelength band includes spontaneous emission light of the optical amplifier unit.

10. An optical amplifier system according to claim 3, wherein the surge control light having the wide wavelength band includes spontaneous emission light of the optical amplifier unit.

11. An optical amplifier system according to claim 4, wherein the surge control light having the wide wavelength band includes spontaneous emission light of the optical amplifier unit.

12. An optical amplifier system according to claim 6, wherein the surge control light having the wide wavelength band includes spontaneous emission light of the optical amplifier unit.

13. An optical transmission system according to claim 7, wherein the surge control light having the wide wavelength band includes spontaneous emission light of the optical amplifier unit.

* * * * *